(12) United States Patent
Ise et al.

(10) Patent No.: US 10,741,830 B2
(45) Date of Patent: Aug. 11, 2020

(54) ELECTRODE, SECONDARY BATTERY, BATTERY PACK, AND VEHICLE

(71) Applicant: KABUSHIKI KAISHA TOSHIBA, Minato-ku (JP)

(72) Inventors: Kazuki Ise, Kawasaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 161 days.

(21) Appl. No.: 15/697,958

(22) Filed: Sep. 7, 2017

(65) Prior Publication Data

US 2018/0277835 A1 Sep. 27, 2018

(30) Foreign Application Priority Data

Mar. 24, 2017 (JP) ................ 2017-058355

(51) Int. Cl.
| | |
|---|---|
| *H01M 4/131* | (2010.01) |
| *H01M 4/485* | (2010.01) |
| *H01M 4/133* | (2010.01) |
| *H01M 4/583* | (2010.01) |
| *H01M 4/587* | (2010.01) |

(Continued)

(52) U.S. Cl.
CPC .......... *H01M 4/364* (2013.01); *H01M 4/131* (2013.01); *H01M 4/366* (2013.01); *H01M 4/485* (2013.01); *H01M 4/583* (2013.01); *H01M 4/587* (2013.01); *H01M 4/625* (2013.01); *H01M 10/052* (2013.01); *H01M 10/0525* (2013.01); *H01M 10/0567* (2013.01); *H01M 2004/027* (2013.01); *H01M 2220/20* (2013.01); *H01M 2300/0025* (2013.01); *Y02E 60/122* (2013.01)

(58) Field of Classification Search
CPC ....... H01M 4/364; H01M 4/366; H01M 4/485
See application file for complete search history.

(56) References Cited

U.S. PATENT DOCUMENTS

| | | |
|---|---|---|
| 2010/0047695 A1 | 2/2010 | Smart et al. |
| 2011/0039067 A1 | 2/2011 | Seth et al. |

(Continued)

FOREIGN PATENT DOCUMENTS

| | | |
|---|---|---|
| JP | 2010-287496 | 12/2010 |
| JP | 2011-044312 A | 3/2011 |

(Continued)

OTHER PUBLICATIONS

Jian-Tao Han, et al., "New Anode Framework for Rechargeable Lithium Batteries," 2011, Chemistry of Materials, vol. 23, No. 8, pp. 2027-2029.

*Primary Examiner* — James Lee
(74) *Attorney, Agent, or Firm* — Oblon, McClelland, Maier & Neustadt, L.L.P.

(57) ABSTRACT

According to one embodiment, an electrode including active material particles is provided. The active material particles contain monoclinic niobium-titanium composite oxide particles and an amorphous carbon body. The amorphous carbon body covers at least a part of surfaces of the monoclinic niobium-titanium composite oxide particles. A ratio S2/S1 of a carbon atom concentration S2 to a niobium atom concentration S1 at a surface of the electrode, according to X-ray photoelectron spectroscopy, is from 5 to 100.

12 Claims, 19 Drawing Sheets

(51) Int. Cl.
*H01M 10/0525* (2010.01)
*H01M 4/36* (2006.01)
*H01M 4/62* (2006.01)
*H01M 10/0567* (2010.01)
*H01M 10/052* (2010.01)
*H01M 4/02* (2006.01)

(56) References Cited

U.S. PATENT DOCUMENTS

| | | |
|---|---|---|
| 2012/0052401 A1 | 3/2012 | Goodenough et al. |
| 2013/0136984 A1 | 5/2013 | Kim et al. |
| 2013/0161558 A1 | 6/2013 | Kawamura et al. |
| 2014/0295231 A1 | 10/2014 | Ise et al. |
| 2015/0086872 A1 | 3/2015 | Ise et al. |
| 2015/0380787 A1* | 12/2015 | Ishii ..................... H01M 4/485 429/9 |
| 2016/0036039 A1 | 2/2016 | Kuriyama et al. |
| 2016/0036048 A1 | 2/2016 | Naito et al. |
| 2016/0276662 A1 | 9/2016 | Ise et al. |
| 2017/0077510 A1 | 3/2017 | Zhang et al. |

FOREIGN PATENT DOCUMENTS

| | | |
|---|---|---|
| JP | 2013-535787 A | 9/2013 |
| JP | 5569980 | 8/2014 |
| JP | 2014-177123 | 9/2014 |
| JP | 2014-209445 | 11/2014 |
| JP | 2015-084321 | 4/2015 |
| JP | 2016-035902 | 3/2016 |
| JP | 2016-103325 | 6/2016 |
| JP | 2016-177972 | 10/2016 |
| JP | 2017-59302 A | 3/2017 |
| JP | 2017-059398 A | 3/2017 |
| KR | 10-2016-0015141 A | 2/2016 |

\* cited by examiner

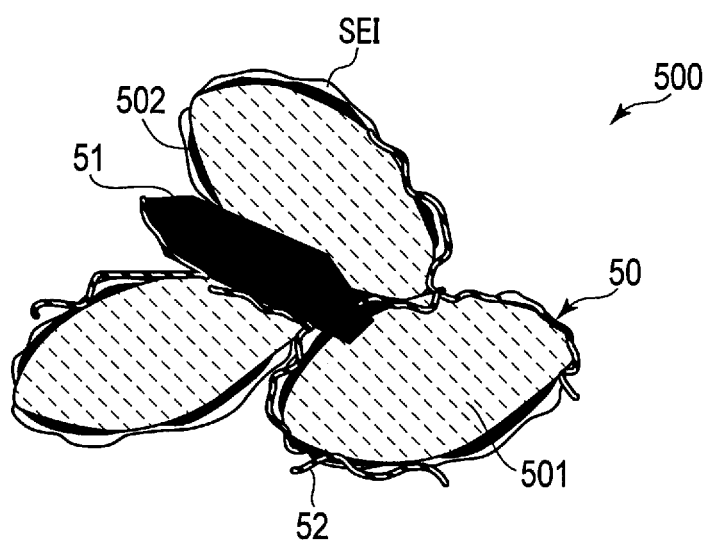
F I G. 1

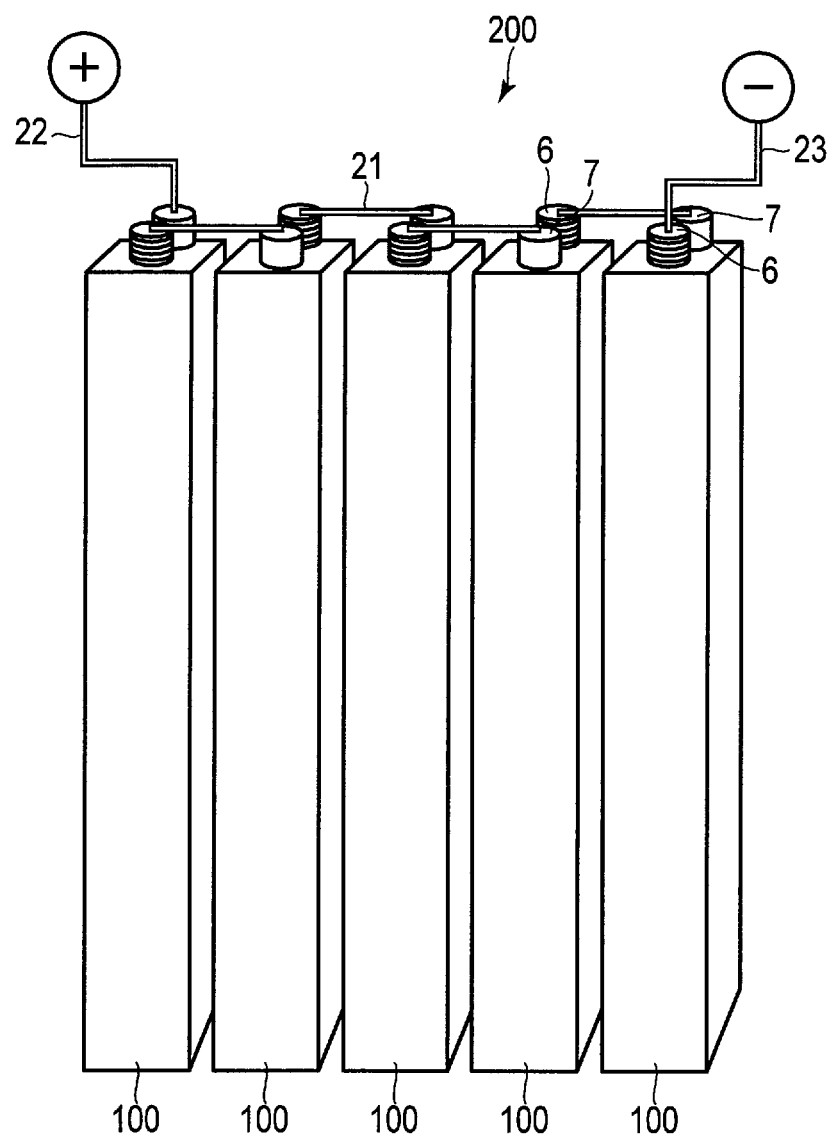
F I G. 8

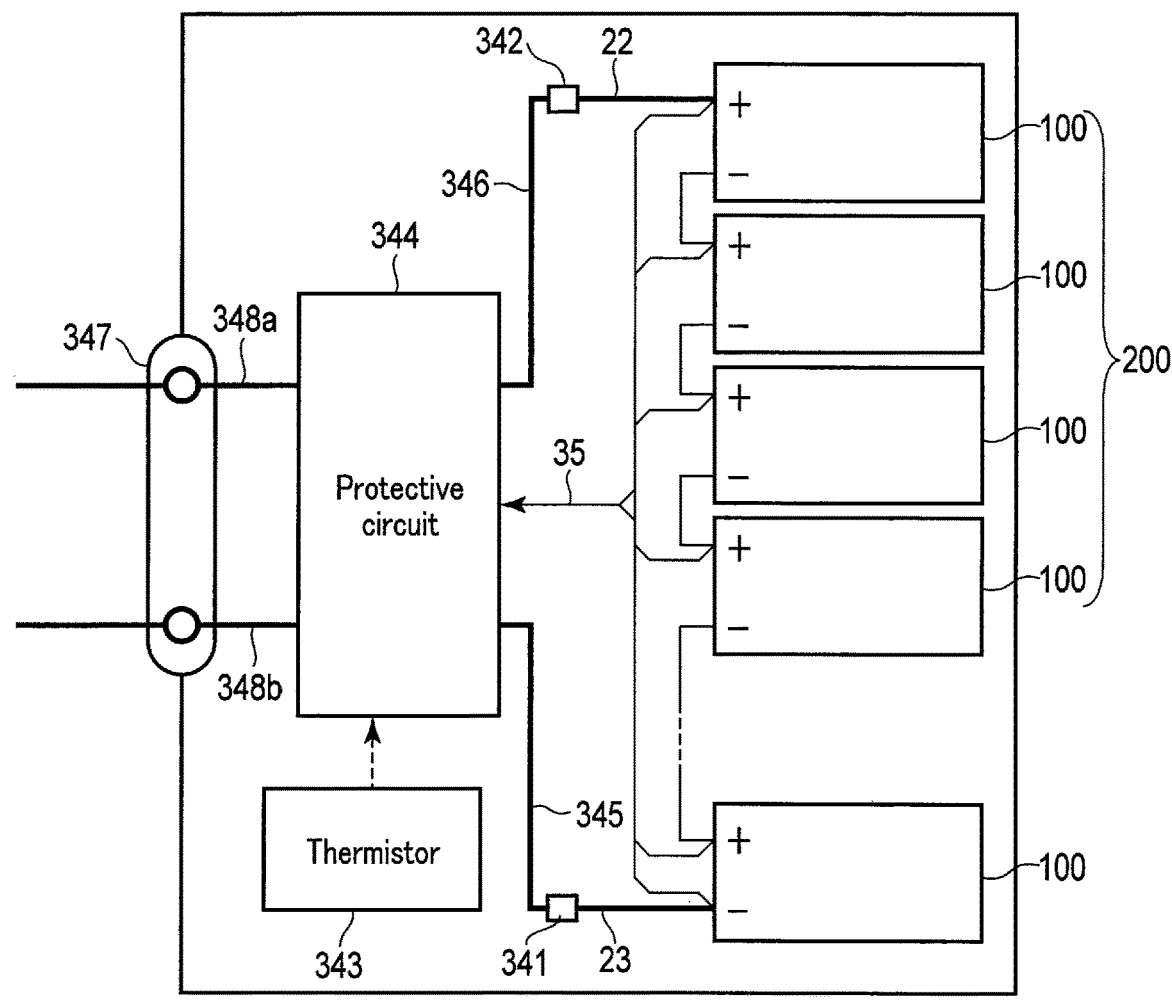
F I G. 10
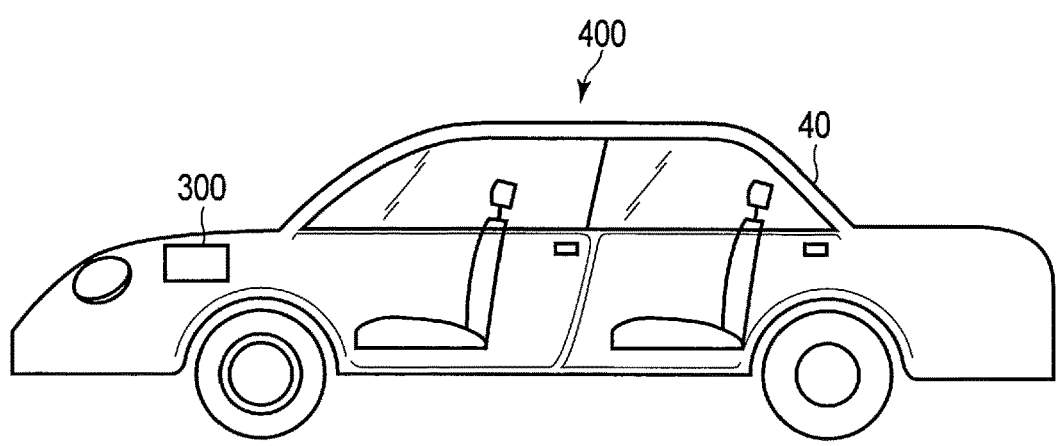
F I G. 11

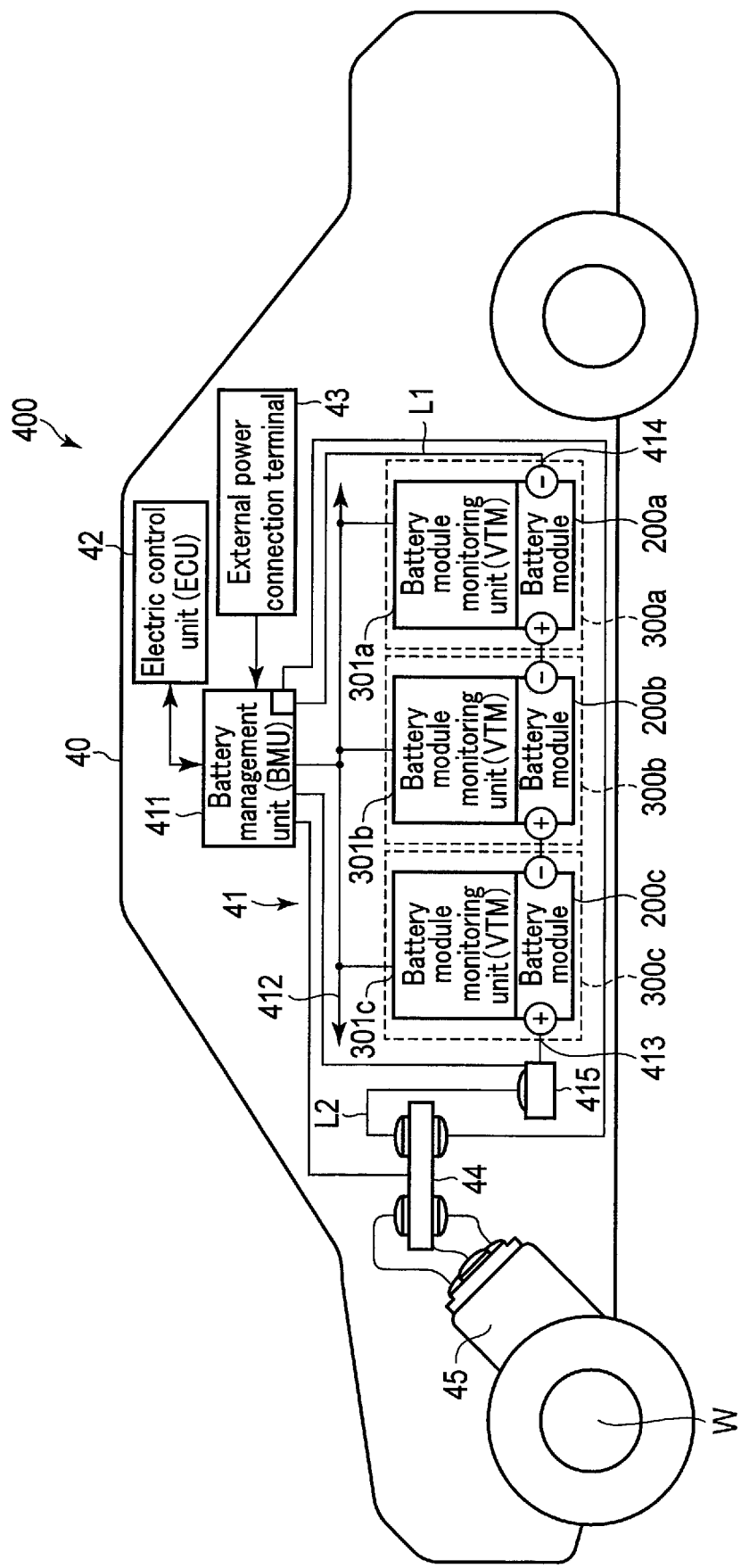
F I G. 12

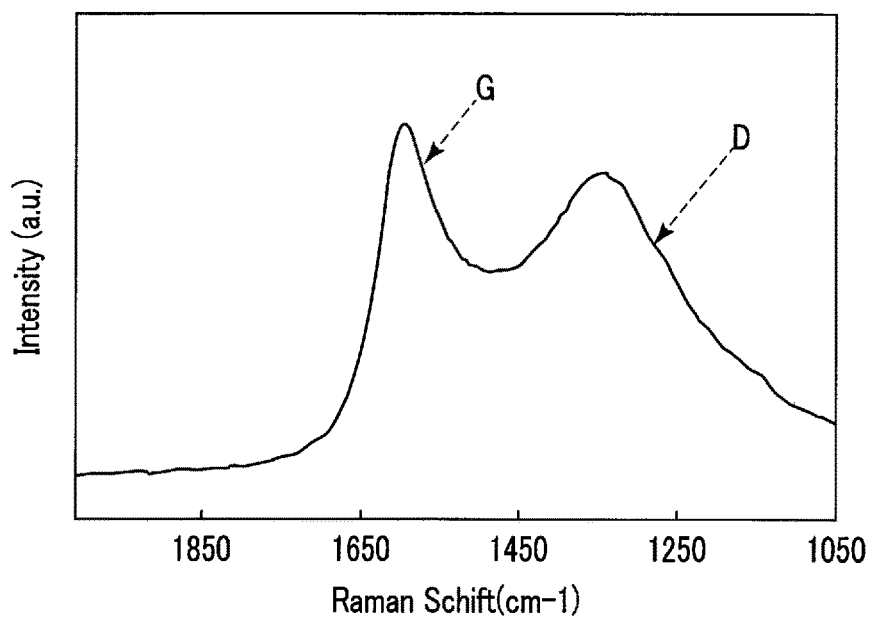
F I G. 13
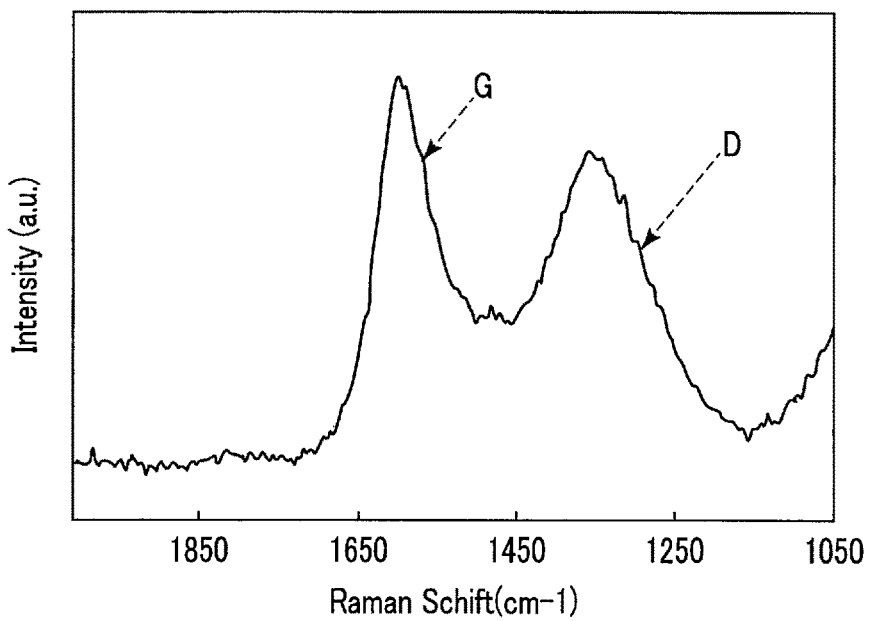
F I G. 14

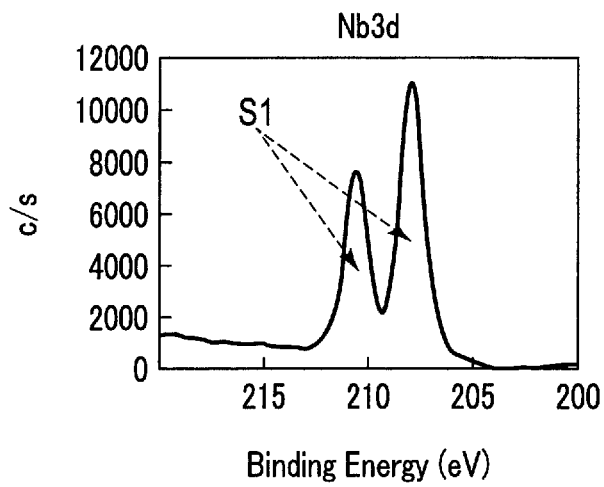
F I G. 15
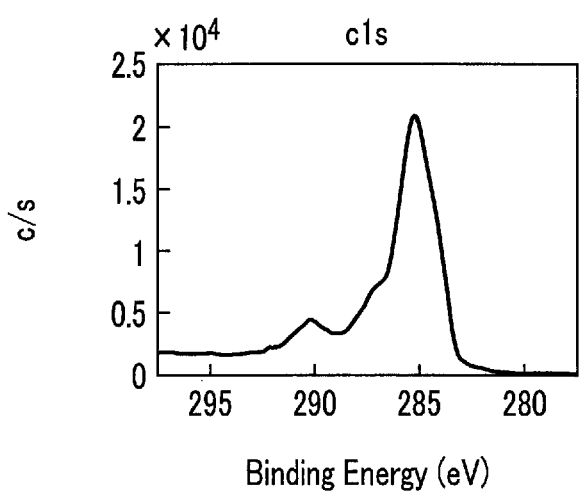
F I G. 16

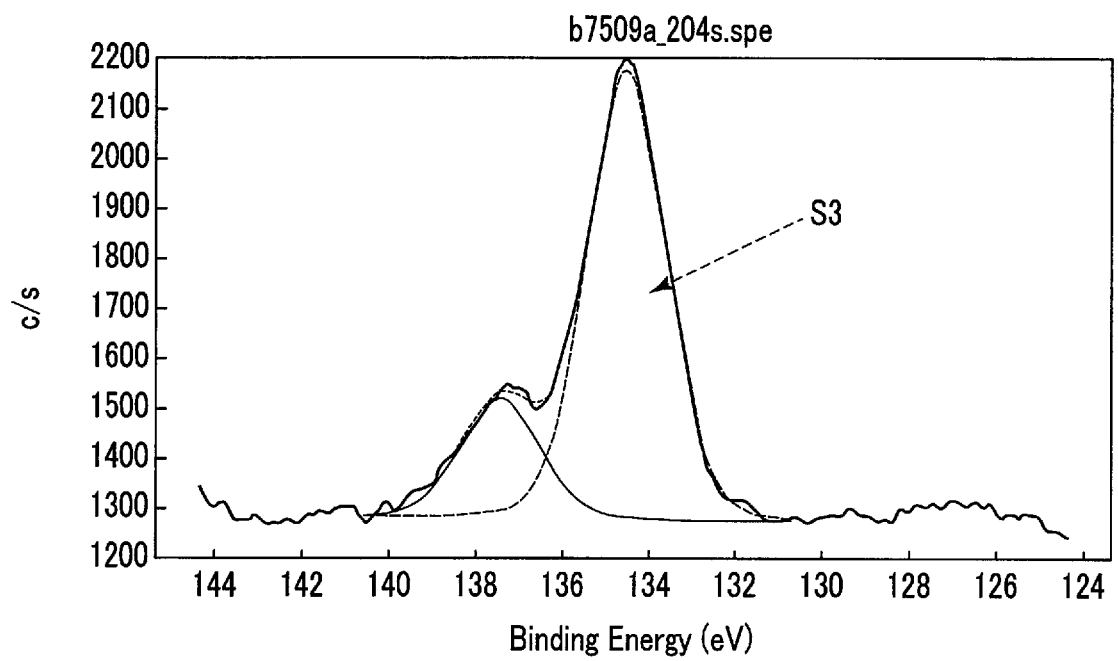
F I G. 19
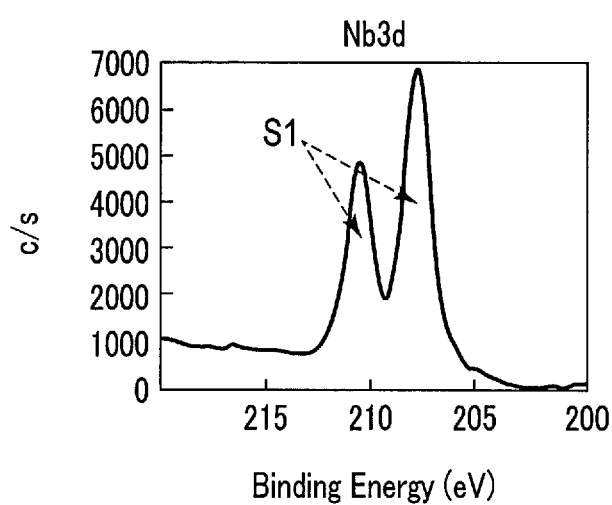
F I G. 20

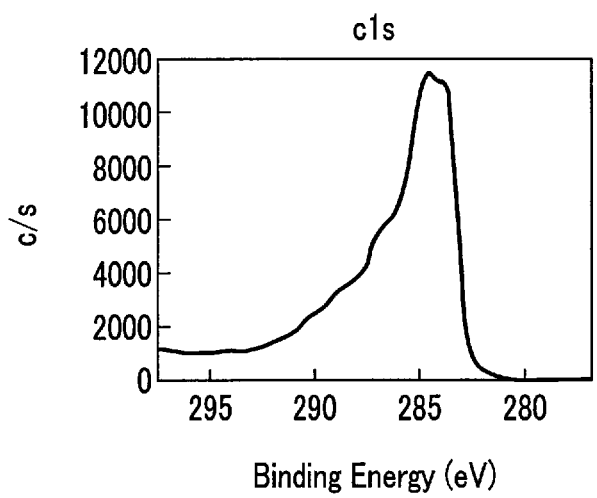
F I G. 21
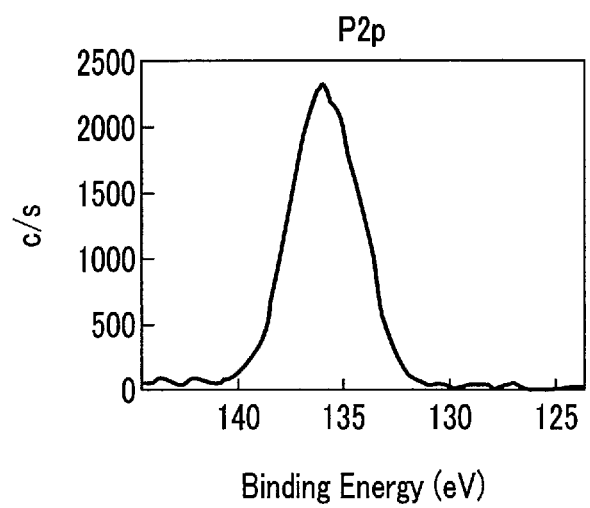
F I G. 22

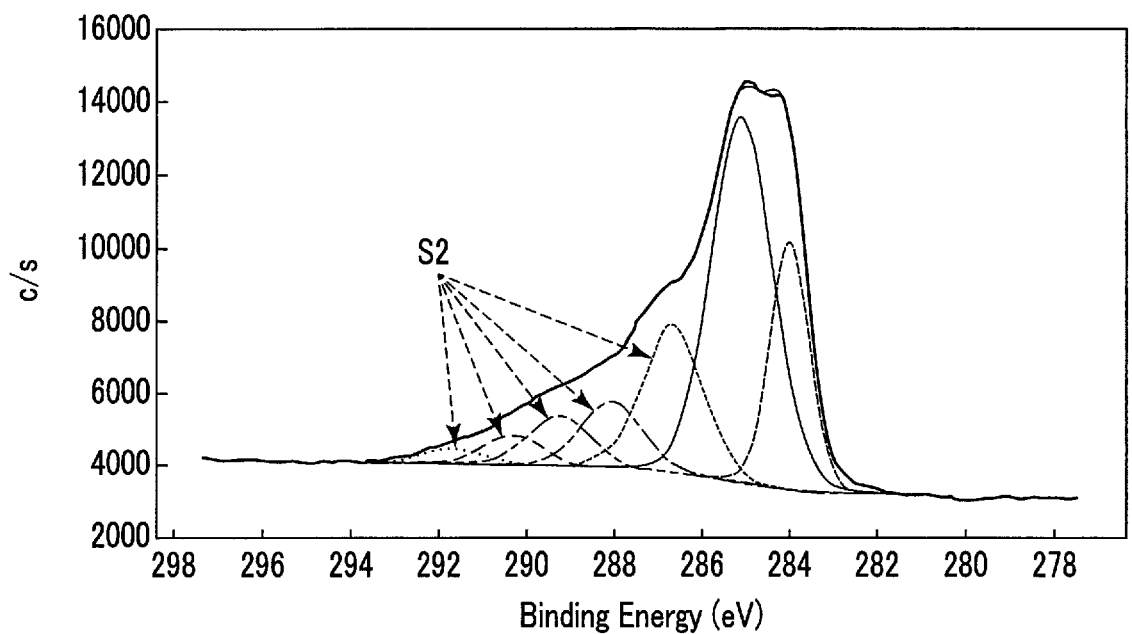
F I G. 23
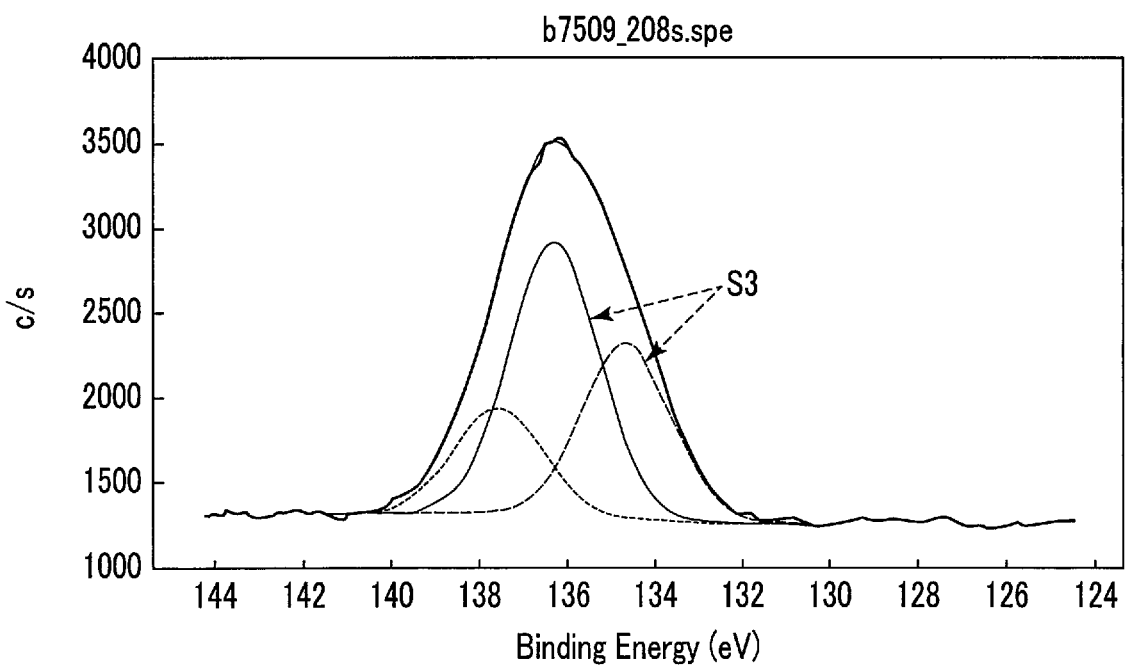
F I G. 24

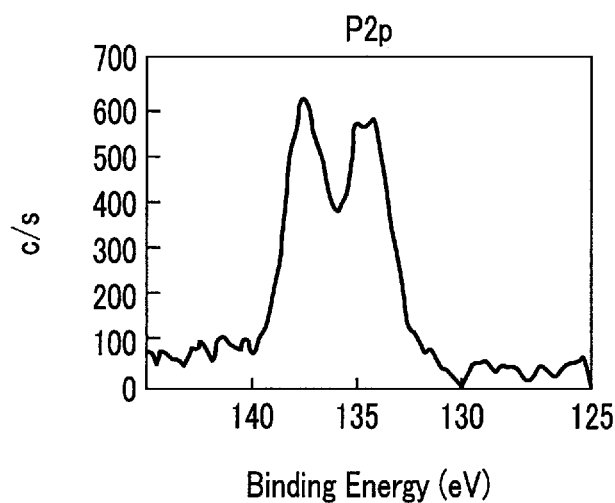
F I G. 27
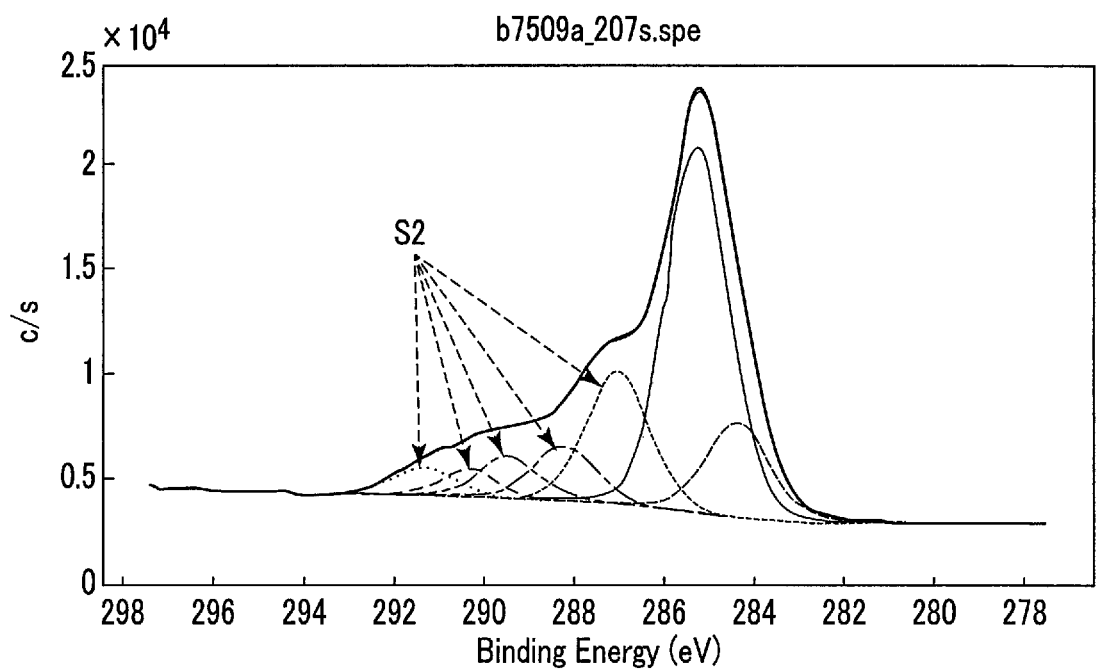
F I G. 28

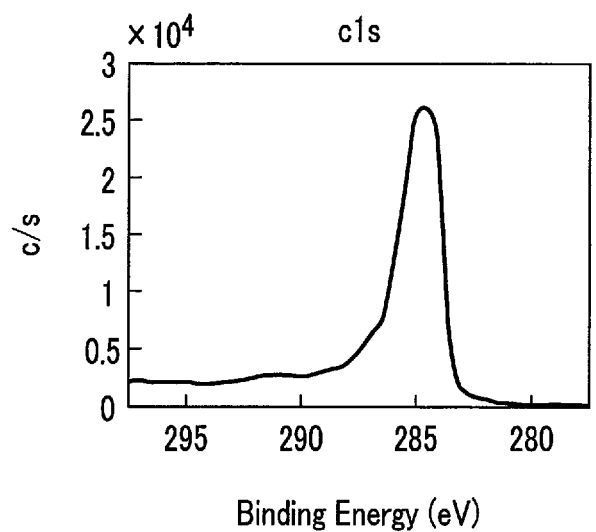
F I G. 31
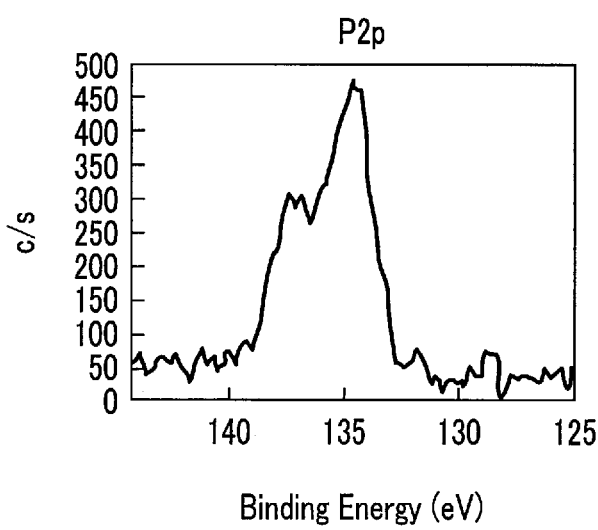
F I G. 32

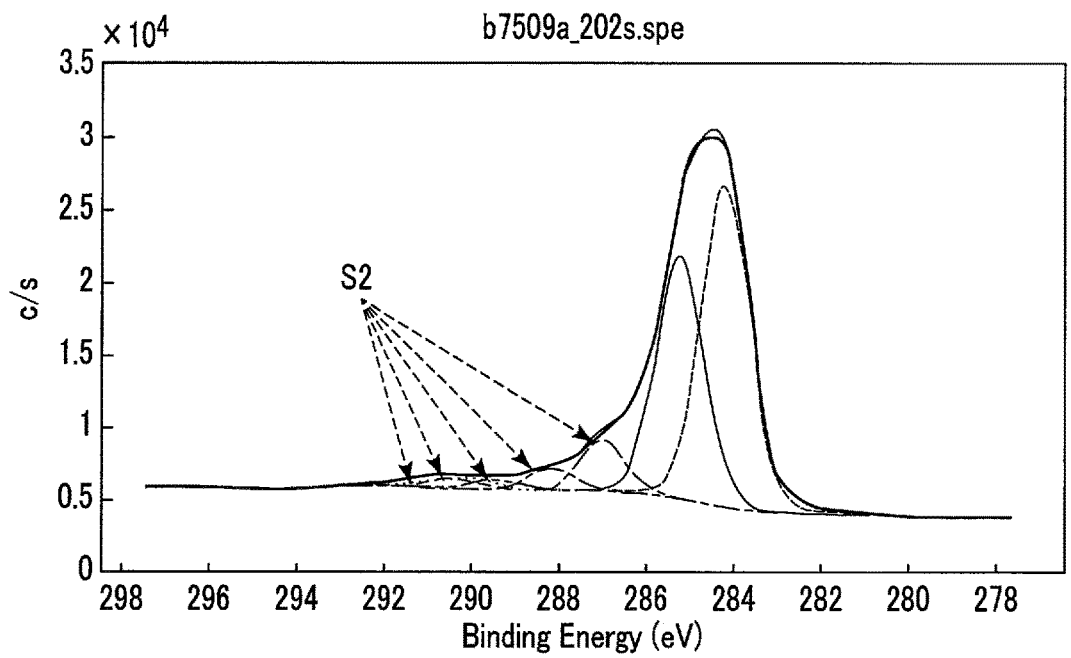
F I G. 33
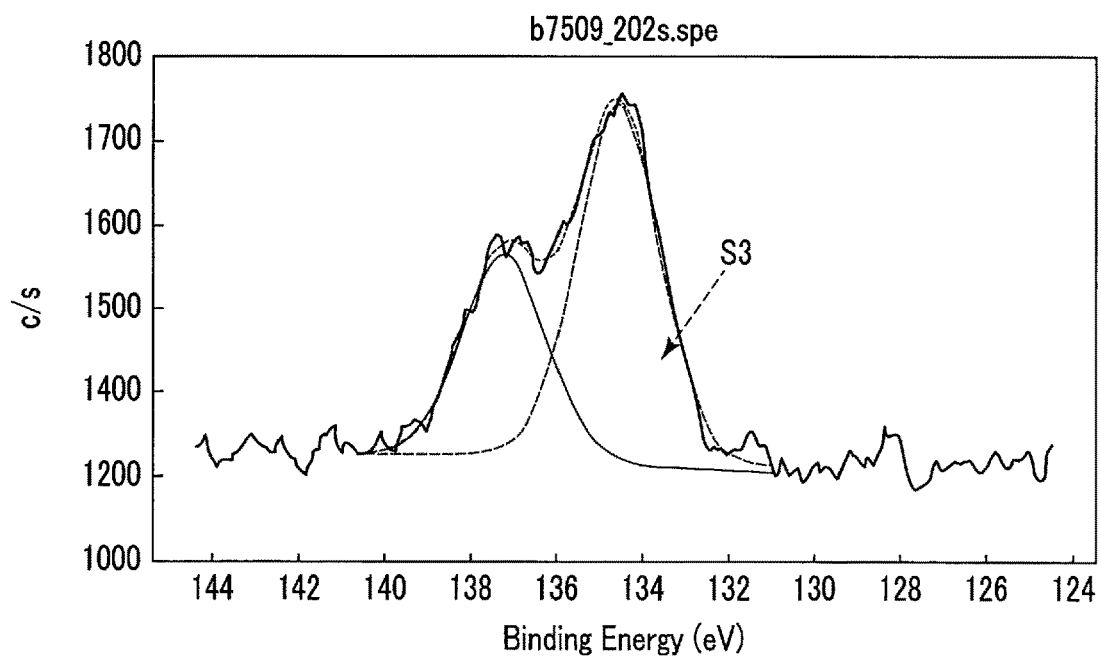
F I G. 34

ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2017-58355, filed Mar. 24, 2017; the entire contents of which are incorporated herein by reference.

FIELD

Embodiments described herein relate generally to an electrode, a secondary battery, a battery pack, and a vehicle.

BACKGROUND

In recent years, a secondary battery such as a lithium-ion secondary battery or a nonaqueous electrolyte secondary battery has been developed as a battery having a high energy density. The secondary battery is expected to be used as a power source for vehicles such as a hybrid automobile and an electric automobile, or as a large-sized power source for power storage. When the secondary battery is used as the power source for vehicles, the secondary battery is required to achieve rapid charge-and-discharge performance and long-term reliability or the like in addition to the high energy density.

Lithium ions and electrons rapidly move through an electrolyte and an external circuit respectively between a positive electrode and a negative electrode which can insert and extract the lithium ions and the electrons, to enable to perform rapid charge-and-discharge. The battery capable of performing rapid charge-and-discharge has the advantage that a charging time is considerably short. When the battery capable of performing rapid charge-and-discharge is used as the power source for vehicles, the motive performances of the automobile can be improved, and the regenerative energy of power can be efficiently recovered.

A carbon-based negative electrode using a carbonaceous material such as graphite as a negative electrode active material is used as a negative electrode capable of inserting and extracting lithium ions and electrons. However, when rapid charge-and-discharge is repeated in a battery including the carbon-based negative electrode, dendrites of metal lithium may precipitate on the negative electrode. The dendrites of metal lithium may cause an internal short circuit. Therefore, when the rapid charge-and-discharge is repeated in the battery including the carbon-based negative electrode, a concern is raised that heat generation and ignition may occur.

Therefore, a battery including a negative electrode using a metal composite oxide as the negative electrode active material in place of the carbonaceous material has been developed. In particular, in a battery using a titanium oxide of the metal composite oxide as the negative electrode active material, the dendrites of metal lithium are less likely to precipitate even when rapid charge-and-discharge is repeated as compared with those of the battery including the carbon-based negative electrode. The battery using the titanium oxide has more stable rapid charge-and-discharge and a longer life than those of the battery including the carbon-based negative electrode.

However, the titanium oxide has a higher (nobler) potential relative to lithium metal than that of the carbonaceous material. In addition, the titanium oxide has a lower theoretical capacity per unit mass than that of the carbonaceous material. For this, there is a problem that the battery including a negative electrode using the titanium oxide as the negative electrode active material has a lower energy density than that of the battery including the carbon-based negative electrode.

For example, the potential relative to lithium metal of a lithium-titanium composite oxide such as $Li_4Ti_5O_{12}$ is about 1.5 V (vs. $Li^+/Li$) or more. On the other hand, the potential relative to lithium metal of graphite is about 0.1 V (vs. $Li^+/Li$) or more. Here, the potential relative to lithium metal of the titanium oxide is caused by an oxidation-reduction reaction occurring between trivalent titanium ions and tetravalent titanium ions when lithium ions are electrochemically inserted and extracted. That is, the potential relative to lithium metal of the titanium oxide is inherent to the titanium oxide, and the lowering of the potential is electrochemically limited. Therefore, it is substantially difficult to lower the potential relative to lithium metal of the titanium oxide to improve the energy density. Since the potential of the titanium oxide with respect to lithium metal is high, a battery including a negative electrode containing the titanium oxide secondarily allows stable rapid charge-and-discharge.

The theoretical capacity per unit mass of the lithium-titanium composite oxide such as $Li_4Ti_5O_{12}$ is 175 mAh/g. On the other hand, the theoretical capacity per unit mass of graphite is 372 mAh/g. Furthermore, the titanium oxide has less sites capable of inserting lithium ions in its crystal structure than those of the carbonaceous material, and is likely to stabilize lithium ions in its crystal structure. Therefore, the ratio of the actual capacity of the titanium oxide to the theoretical capacity thereof is lower than the ratio of the actual capacity of the carbonaceous material to the theoretical capacity thereof.

From the above, the energy density of the battery including the negative electrode containing the titanium oxide is remarkably lower than that of the battery having the carbon-based negative electrode.

In view of the above, a new electrode material containing titanium and niobium has been studied. In particular, in a monoclinic niobium-titanium composite oxide represented by $TiNb_2O_7$, tetravalent titanium ions are reduced to trivalent titanium ions and pentavalent niobium ions are reduced to trivalent niobium ions when lithium ions are inserted. Therefore, this monoclinic niobium-titanium composite oxide can maintain the electric neutrality of a crystal structure even when many lithium ions are inserted, as compared with the titanium oxide. As a result, the monoclinic Nb—Ti composite oxide represented by $TiNb_2O_7$ has a high theoretical capacity of 387 mAh/g.

BRIEF DESCRIPTION OF THE DRAWINGS

FIG. 1 is a cross-sectional view schematically showing an example of a negative electrode active material-containing layer of a secondary battery according to a first embodiment;

FIG. 8 is a perspective view schematically showing an example of a battery module according to a second embodiment;

FIG. 10 is a block diagram showing an example of an electric circuit of the battery pack shown in FIG. 9;

FIG. 11 is a cross-sectional view schematically showing an example of a vehicle according to a fourth embodiment;

FIG. 12 schematically shows another example of the vehicle according to the fourth embodiment;

FIG. 13 is a graph showing a Raman spectrum according to Example 1;

FIG. 14 is a graph showing a Raman spectrum according to Comparative Example 6;

FIG. 15 is a graph showing a narrow scan spectrum of Nb3d according to Example 1;

FIG. 16 is a graph showing a narrow scan spectrum of C1s according to Example 1;

FIG. 19 is a graph showing a narrow scan spectrum of P2p shown in FIG. 17 after peak separation;

FIG. 20 is a graph showing a narrow scan spectrum of Nb3d according to Example 3;

FIG. 21 is a graph showing a narrow scan spectrum of C1s according to Example 3;

FIG. 22 is a graph showing a narrow scan spectrum of P2p according to Example 3;

FIG. 23 is a graph showing a narrow scan spectrum of C1s shown in FIG. 21 after peak separation;

FIG. 24 is a graph showing a narrow scan spectrum of P2p shown in FIG. 22 after peak separation;

FIG. 27 is a graph showing a narrow scan spectrum of P2p according to Example 23;

FIG. 28 is a graph showing a narrow scan spectrum of C1s shown in FIG. 26 after peak separation;

FIG. 31 is a graph showing a narrow scan spectrum of C1s according to Comparative Example 1;

FIG. 32 is a graph showing a narrow scan spectrum of P2p according to Comparative Example 1;

FIG. 33 is a graph showing a narrow scan spectrum of C1s shown in FIG. 31 after peak separation; and FIG. 34 is a graph showing a narrow scan spectrum of P2p shown in FIG. 32 after peak separation.

DETAILED DESCRIPTION

Figure 2:
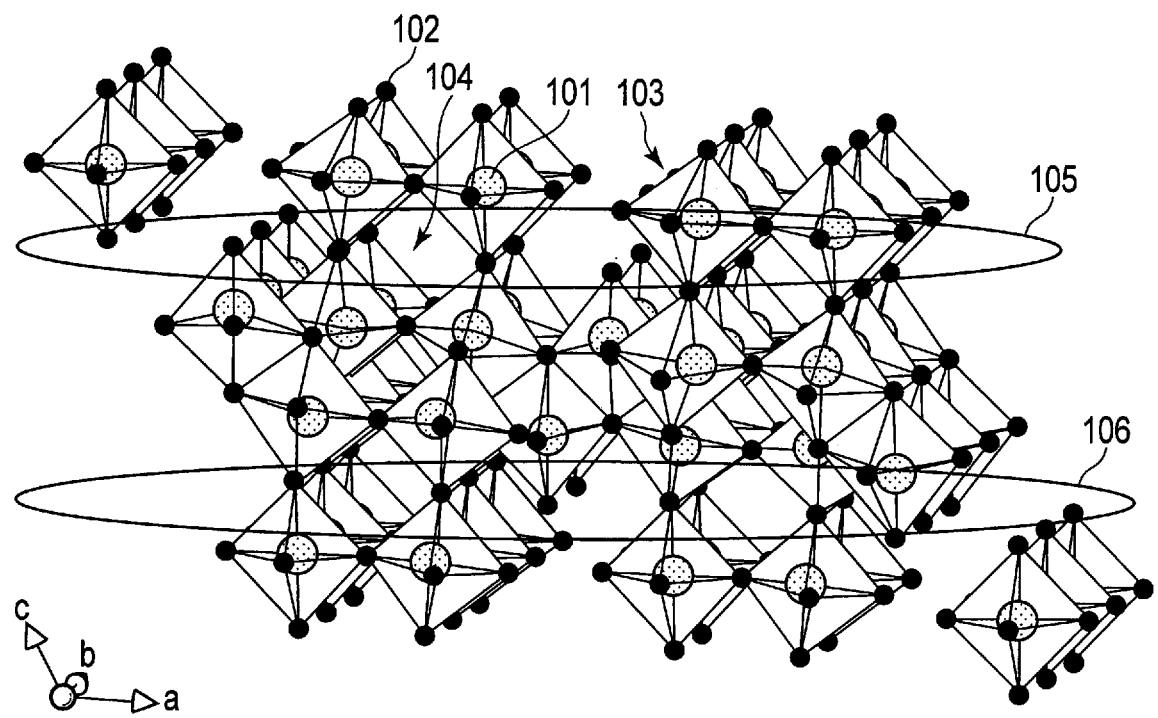
FIG. 2 is a schematic view showing an example of the crystal structure of a monoclinic niobium-titanium composite oxide.

According to one embodiment, an electrode including active material particles is provided. The active material particles contain monoclinic niobium-titanium composite oxide particles and an amorphous carbon body. The amorphous carbon body covers at least a part of surfaces of the monoclinic niobium-titanium composite oxide particles. A ratio S2/S1 of a carbon atom concentration S2 to a niobium atom concentration S1 at a surface of the electrode, according to X-ray photoelectron spectroscopy, is from 5 to 100. The niobium atom concentration S1 is an intensity of an area for a peak related to Nb3s. The carbon atom concentration S2 is a total of intensities of areas for peaks related to C1s. The peaks related to C1s are within a range of 286 eV to 294 eV. The peaks related to C1s include a peak assigned to a C—O bond, a peak assigned to a C=O bond, a peak assigned to a C(=O)—O bond, and a peak assigned to a $CO_3^{2-}$ bond.

According to another embodiment, a second battery is provided. The second battery includes a negative electrode, a positive electrode, and an electrolyte. The negative electrode is the electrode according to the embodiment.

According to further another embodiment, a battery pack is provided. The battery pack includes a secondary battery according to the embodiment.

According to even another embodiment, a vehicle is provided. The vehicle includes a battery pack according to the embodiment.

During the initial charge of a secondary battery such as a lithium ion secondary battery or a nonaqueous electrolyte secondary battery, lithium ions are inserted between layers of a negative electrode active material in a negative electrode. At the same time, electrons move to the negative electrode via an external circuit. As a result, the negative electrode active material is reduced, and a negative electrode potential relative to lithium metal of the negative electrode (hereinafter, simply referred to as a potential) is lowered. In contrast, lithium ions and electrons are emitted from a positive electrode. As a result, a positive electrode active material is oxidized, and a positive electrode potential is increased.

The difference between the negative electrode potential and the positive electrode potential at the state of full charge is the voltage of the secondary battery. One of methods of increasing the voltage is a method of lowering the negative electrode potential at the state of full charge.

In a negative electrode using a carbonaceous material such as graphite, the lower limit value of a negative electrode potential during charge is about 0 V (vs. $Li^+/Li$), and is very low. A coating film referred to as a solid electrolyte interface (SEI) is considered to be formed on at least a part of the main surface of such a negative electrode. This SEI is generated on the surface of the negative electrode during the initial charge of the battery. Specifically, when the negative electrode potential drops to around 1.0 V (vs. $Li^+/Li$) by charge, at least one of an electrolyte salt and nonaqueous solvent contained in a nonaqueous electrolyte is decomposed by reduction in the negative electrode. A decomposition product generated by the decomposition is deposited on the surface of the negative electrode. By stacking the deposit, the SEI is formed.

The graphite has a structure in which a plurality of graphene sheets are stacked. This graphene sheet is composed of carbon atoms covalently bonded by an $sp^2$ hybridized orbital. The plurality of graphene sheets are bonded by van der Waals force. The bond provided by the van der Waals force is weaker than covalent bond. Therefore, when the graphite is used as the negative electrode active material, solvated lithium ions are inserted between the graphene sheets during initial charge. That is, the nonaqueous solvent of the nonaqueous electrolyte is co-inserted together with lithium ions between the graphene sheets. The solvent inserted between the graphene sheets is decomposed by reduction between the graphene sheets. This decomposition product contributes to SEI formation between the graphene sheets.

From the above, in the negative electrode containing the graphite, the SEI is considered to be generated on the surface of the negative electrode and generated between the graphene sheets in the graphite structure. This SEI plays a passive role, and suppresses further decomposition of the nonaqueous electrolyte in the negative electrode. The SEI has lithium ion conductivity, but it does not have electron conductivity. Therefore, the negative electrode on which the SEI is formed can stably insert lithium ions.

However, lithium ions are used together with the nonaqueous electrolyte in order to generate the SEI. When the lithium ions permeate the SEI during charge and discharge, resistance occurs. Therefore, when the film thickness of the SEI is increased, the lithium ions are decreased, and the internal resistance is increased, which tends to decrease the capacity of the negative electrode.

In the negative electrode using the monoclinic niobium-titanium composite oxide, the lower limit value of the negative electrode potential during charge is about 1.4 V (vs. Li$^+$/Li), which is relatively high. Since the negative electrode potential is not decreased to about 1.0 V (vs. Li$^+$/Li) at the state of full charge in such a negative electrode, the reductive decomposition of the nonaqueous electrolyte is less likely to occur, and the SEI is also less likely to be generated. Therefore, since the decrease of the lithium ions and the increase of the internal resistance are less likely to occur in the case of using such a negative electrode, charge and discharge can be stably performed.

For example, by over-charge, the lower limit value of the negative electrode potential of about 1.4 V (vs. Li$^+$/Li) can be lowered to, for example, the range of about 1.0 V (vs. Li$^+$/Li) to 1.2 V (vs. Li$^+$/Li) in the negative electrode using the monoclinic niobium-titanium composite oxide. And then the battery voltage is increased, which can increase the charge-and-discharge capacity of the battery. However, when the lower limit value of the negative electrode potential during charge is set within this range, the reductive decomposition of the nonaqueous electrolyte is likely to occur. Furthermore, when the lower limit value of the negative electrode potential during charge is within this range, the coating film such as the SEI described above is less likely to be generated, which makes it difficult to suppress further reductive decomposition of the nonaqueous electrolyte. Therefore, the battery in which the lower limit value of the negative electrode potential during charge is within the range of 1.0 V (vs. Li$^+$/Li) to 1.2 V (vs. Li$^+$/Li) tends to have a higher energy density and a shorter life than those of a battery in which the lower limit value of the negative electrode potential during full charge is about 1.4 V (vs. Li$^+$/Li).

When the lower limit value of the negative electrode potential of the negative electrode using the monoclinic niobium-titanium composite oxide during charge is set to be lower than 1.0 V (vs. Li$^+$/Li), the voltage of the battery can be increased, and the capacity of the battery can be increased. It is considered that, when the lower limit value of the negative electrode potential during charge is set to be lower than 1.0 V (vs. Li$^+$/Li), the reductive decomposition of the nonaqueous electrolyte occurs as with the negative electrode containing graphite, and the coating film such as the SEI is formed on the surface of the negative electrode. The generation of the SEI is considered to allow further reductive decomposition of the nonaqueous electrolyte in the negative electrode to be suppressed.

However, the crystal structure of the monoclinic niobium-titanium composite oxide is largely different from the crystal structure of the graphite. That is, in the monoclinic niobium-titanium composite oxide, a skeleton structure portion is formed by the covalent bond of oxide ions. Therefore, it is considered that lithium ions are inserted into a void portion which is the lithium ion insertion site of the monoclinic niobium-titanium composite oxide, but the solvent of the nonaqueous electrolyte is not inserted into the void portion. Most of dangling bonds on the surface of the monoclinic niobium-titanium composite oxide are terminated with hydroxyl groups. On the other hand, most of dangling bonds on the surface of graphite are not terminated with functional groups or the like, and n electrons are present.

Furthermore, in a state where the lower limit of the negative electrode potential during charge is set to be lower than 1.0 V (vs. Li$^+$/Li), lithium ions are considered to be excessively inserted into the void portion of the monoclinic niobium-titanium composite oxide. As a result of the insertion of the excessive lithium ions, the reduction reaction of the monoclinic niobium-titanium composite oxide during charge becomes unstable, which may cause a change in the crystal structure of the monoclinic niobium-titanium composite oxide.

In view of the above, when the lower limit value of the negative electrode potential of the negative electrode using the monoclinic niobium-titanium composite oxide during charge is set to be lower than 1.0 V (vs. Li$^+$/Li), it is difficult to form an SEI which exhibits the same effect as that of the negative electrode containing graphite on the surface of the negative electrode.

First Embodiment

An electrode according to a first embodiment contains active material particles. The active material particles contain monoclinic niobium-titanium composite oxide particles and an amorphous carbon body covering at least a part of the surfaces of the monoclinic niobium-titanium composite oxide particles. The ratio S2/S1 of a carbon atom concentration S2 to a niobium atom concentration S1 at the surface of the electrode obtained by X-ray photoelectron spectroscopy is from 5 to 100. The niobium atom concentration S1 is calculated from an intensity of an area for a peak related to Nb3d. The carbon atom concentration S2 is calculated from the total of intensities of areas for peaks related to C1s, the peaks related to C1s appearing within a range of 286 eV to 294 eV and comprising a peak assigned to a C—O bond, a peak assigned to a C=O bond, a peak assigned to a C(=O)—O bond, and a peak assigned to a $CO_3^{2-}$ bond.

The electrode according to the first embodiment will be described below together with an embodiment of a secondary battery. The secondary battery include the electrode according to the first embodiment as a negative electrode. The secondary battery comprises a negative electrode containing negative electrode active material particles, a positive electrode, and an electrolyte. The negative electrode active material particles contain monoclinic niobium-titanium composite oxide particles and an amorphous carbon body covering at least a part of the surfaces of the monoclinic niobium-titanium composite oxide particles. The ratio S2/S1 of the carbon atom concentration S2 to the niobium atom concentration S1 at the surface of the negative electrode obtained by X-ray photoelectron spectroscopy is from 5 to 100. The niobium atom concentration S1 is calculated from an intensity of an area for a peak related to Nb3d. The carbon atom concentration S2 is calculated from the total of intensities of areas for peaks related to C1s, the peaks related to C1s appearing within a range of 286 eV to 294 eV and comprising a peak assigned to a C—O bond, a peak assigned to a C=O bond, a peak assigned to a C(=O)—O bond, and a peak assigned to a $CO_3^{2-}$ bond.

In the secondary battery according to the first embodiment, a coating film generated by the reductive decomposition of the electrolyte is provided on the surface of the negative electrode. This coating film plays the same role as that of an SEI provided on the surface of the abovementioned negative electrode containing the graphite. Specifically, the ratio S2/S1 of the carbon atom concentration S2 to the niobium atom concentration S1 at the surface of the negative electrode obtained by X-ray photoelectron spectroscopy is from 5 to 100. On the surfaces of the negative electrode active material particles contained in the negative electrode, a favorable coating film suppressing further reductive decomposition of the electrolyte and having low internal resistance is provided.

Therefore, such a negative electrode can suppress further reductive decomposition of a nonaqueous electrolyte even if the lower limit value of a negative electrode potential during charge is set to be lower than 1.0 V (vs. $Li^+/Li$). Therefore, the nonaqueous electrolyte secondary battery according to the first embodiment including the negative electrode can achieve a high energy density and excellent cycle characteristics.

The secondary battery according to the first embodiment includes a negative electrode, a positive electrode, and an electrolyte.

The secondary battery according to the first embodiment can further include a separator disposed between the positive electrode and the negative electrode. The positive electrode, the negative electrode, and the separator can constitute an electrode group. The electrolyte may be held in the electrode group.

The secondary battery according to the first embodiment can further include a container member housing the electrode group and the electrolyte.

Furthermore, the secondary battery according to the first embodiment can further include a positive electrode terminal electrically connected to the positive electrode and a negative electrode terminal electrically connected to the negative electrode.

Hereinafter, the negative electrode, the positive electrode, the electrolyte, the separator, the container member, the positive electrode terminal, and the negative electrode terminal will be described in detail.

1) Negative Electrode

In the secondary battery according to the first embodiment, the negative electrode is placed so as to face the positive electrode. The negative electrode includes a negative electrode current collector and a negative electrode active material-containing layer. The negative electrode active material-containing layer is provided on at least one-main surface of the negative electrode current collector. At least a part of the negative electrode current collector faces a positive electrode current collector with the negative electrode active material-containing layer interposed therebetween.

FIG. 1 is a cross-sectional view schematically showing an example of the negative electrode active material-containing layer of the secondary battery according to the first embodiment. FIG. 1 is an enlarged cross-sectional view of a part of the surface of a negative electrode active material-containing layer 500 facing the positive electrode. The negative electrode active material-containing layer 500 contains negative electrode active material particles 50, a conductive agent 51, a binder 52, and a coating film SEI. The negative electrode active material particles 50 contain monoclinic niobium-titanium composite oxide particles 501 and an amorphous carbon body 502.

(Negative Electrode Active Material)

The negative electrode active material particles 50 are composed of single primary particles, secondary particles formed by aggregation of a plurality of the primary particles, or a mixture thereof.

The primary particle size of the negative electrode active material particles 50 is preferably 0.1 μm to 5 μm. The setting of the primary particle size of the negative electrode active material particles 50 in this range makes it possible to improve productivity in producing an electrode and to obtain a negative electrode having favorable performance. When the primary particle size of the negative electrode active material particles 50 is more than 5 μm, the diffusion distance of lithium ions in solid is increased, and overvoltage during charge and discharge is increased. Therefore, the use of the negative electrode in which the primary particle size of the negative electrode active material particles 50 is more than 5 μm may cause declining in the input/output characteristics of the battery. On the other hand, the use of the negative electrode in which the primary particle size of the negative electrode active material particles 50 is less than 0.1 μm causes a charge-and-discharge curve having an abrupt change shape, which may cause a decrease in the energy density of the battery.

The secondary particle size of the negative electrode active material particles 50 is preferably 1 μm to 50 μm. When the secondary particle size of the negative electrode active material particles 50 is within this range, productivity during electrode production can be improved, and a negative electrode having favorable performance can be obtained. The secondary particle size of the negative electrode active material particles 50 of less than 1 μm causes declining in the coatability of a slurry produced during electrode production, or makes it necessary to excessively add a conductive auxiliary agent in order to sufficiently keep a conductive path, which is not preferable. On the other hand, the secondary particle size of the negative electrode active material particles 50 of more than 50 μm makes it impossible to sufficiently keep the conductive path in the secondary particles of the negative electrode active material particles 50, which may cause declining in the life performance of the battery.

The primary particle size and the secondary particle size mean a particle size at which a volume integrated value is 50% in a particle size distribution obtained by a laser diffraction type particle size distribution measuring apparatus. As a sample when the particle size distribution measurement is performed, a dispersion solution is used, which is obtained by diluting the negative electrode active material particles 50 with N-methyl-2-pyrrolidone so that the concentration of the negative electrode active material particles 50 is set to 0.1% by mass to 1% by mass.

The BET specific surface area of the negative electrode active material particles 50 is desirably 1 $m^2/g$ to 30 $m^2/g$. By setting the specific surface area of the negative electrode active material particles 50 to 1 $m^2/g$ or more, a contact area between the negative electrode active material particles 50 and the nonaqueous electrolyte can be sufficiently secured. Therefore, the battery including the negative electrode containing such a negative electrode active material particles 50 is likely to have favorable discharge rate characteristics, and can shorten a charge time. The setting of the specific surface area of the negative electrode active material particles 50 to 30 m$^2$/g or less makes it possible to suppress the reactivity between the negative electrode and the nonaqueous electrolyte from being excessively increased. The use of the negative electrode containing such a negative electrode active material particles 50 makes it possible to improve the life characteristics of the battery. The use of such a negative electrode active material particles 50 makes it possible to improve the coatability of the slurry containing the negative electrode active material particles 50 in a producing process of a negative electrode to be described later.

This BET specific surface area means a specific surface area determined by a nitrogen BET (Brunauer, Emmet and Teller) method. The specific surface area based on the nitrogen BET method can be obtained by the following method.

First, the nitrogen gas adsorption amount (mL/g) of the negative electrode active material particles 50 is measured at each pressure P while a nitrogen gas pressure P (mmHg) is gradually increased in nitrogen gas at 77 K (boiling point of nitrogen). Then, an adsorption isotherm is obtained by plotting the adsorption amount of nitrogen gas with respect to each relative pressure $P/P_0$. The relative pressure $P/P_0$ is obtained by dividing the pressure P (mmHg) by a saturated vapor pressure $P_0$ (mmHg) of nitrogen gas. Then, a BET plot is calculated from the nitrogen adsorption isotherm and the BET equation, and a specific surface area is obtained using the BET plot. For the calculation of the BET plot, a BET multipoint method is used.

(Monoclinic Niobium-Titanium Composite Oxide)

The monoclinic niobium-titanium composite oxide particles 501 are composed of single primary particles, secondary particles formed by aggregation of a plurality of primary particles, or a mixture thereof.

Figure 3:
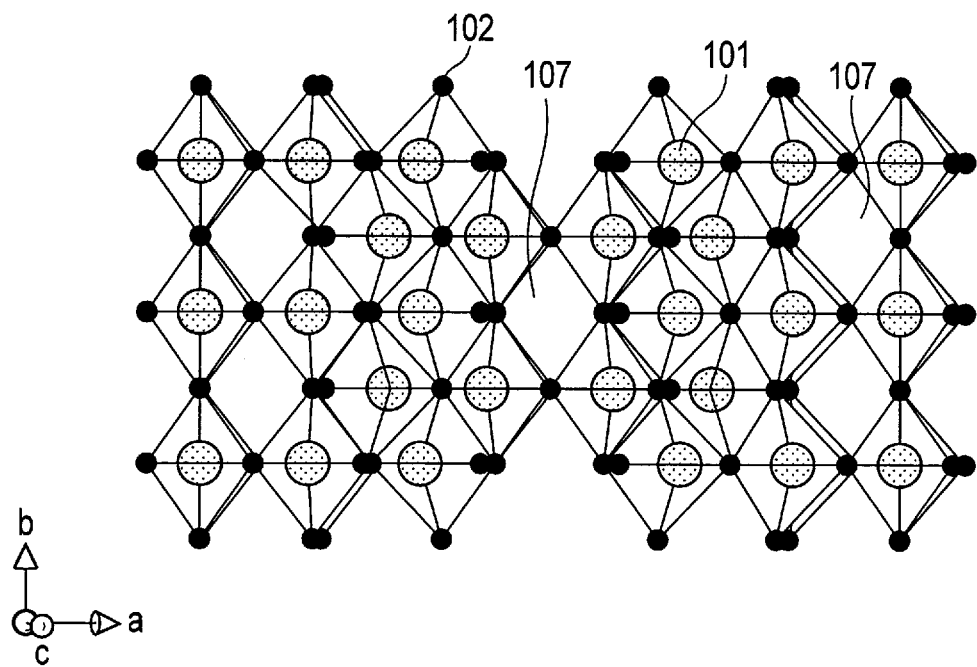
FIG. 3 is a schematic view of the crystal structure shown in FIG. 2 as viewed from another direction.

FIG. 2 is a schematic view showing an example of the crystal structure of a monoclinic niobium-titanium composite oxide. FIG. 3 is a schematic view of the crystal structure shown in FIG. 2 as viewed from another direction. FIGS. 2 and 3 show the crystal structure of $Nb_2TiO_7$ as an example of the monoclinic niobium-titanium composite oxide.

As shown in FIGS. 2 and 3, the crystal structure of $Nb_2TiO_7$ has a configuration in which metal ions 101 and oxide ions 102 constitute a skeleton structure portion 103. In each metal ion 101, niobium (Nb) ions and titanium (Ti) ions are arranged in the ratio of Nb to Ti of 2:1 at random. The skeleton structure portions 103 are alternately arranged three-dimensionally. Void portions 104 are provided among the skeleton structure portions 103. The void portions 104 are hosts for lithium ions. The void portions 104 occupy a large portion with respect to the entire crystal structure as show in FIG. 2. In addition, the void portions 104 can maintain a structure stably even if lithium ions are inserted.

Regions 105 and 106 shown in FIGS. 2 and 3 each have two-dimensional channels in a [100] direction and a [010] direction. As shown in FIG. 3, the crystal structure of $Nb_2TiO_7$ has void portions 107. The void portion 107 has a tunnel structure which is suitable for conduction of lithium ions. The void portion 107 is connected to the region 105 and the region 106 as a conductive path in the [001] direction. The presence of the conductive path allows the lithium ions to come and go between the region 105 and the region 106.

The crystal structure of the monoclinic niobium-titanium composite oxide shown in FIGS. 2 and 3 has a large space into which the lithium ions are equivalently inserted, and has a structural stability. Furthermore, the crystal structure includes regions having two-dimensional channels in which the lithium ion diffuses rapidly and a conductive path in the [001] direction connecting the regions. Therefore, in the crystal structure of the monoclinic niobium-titanium composite oxide, the insertion properties of the lithium ions to the insertion space and the extraction properties of the lithium ions from the insertion space are improved, and the insertion-and-extraction space for the lithium ions is effectively increased. This makes it possible to provide a high capacity and high rate performance.

Furthermore, in the above-mentioned crystal structure, when a lithium ion is inserted into the void portion 104, the metal ion 101 constituting the skeleton structure portion 103 is reduced to trivalent, thereby maintaining the electrical neutrality of the crystal. In the monoclinic niobium-titanium composite oxide, not only the Ti ion is reduced from tetravalent to trivalent, but also the Nb ion is reduced from pentavalent to trivalent. For this, the number of reduced valences per active material weight is large. Therefore, even when a large number of lithium ions are inserted, the electrical neutrality of the crystal can be maintained. For this, the monoclinic niobium-titanium composite oxide has a higher energy density than that of a compound such as a titanium oxide containing only a tetravalent cation. Specifically, the theoretical capacity of the monoclinic niobium-titanium composite oxide is about 387 mAh/g, which is more than twice the value of a titanium oxide having a spinel structure.

The crystal structure of the monoclinic niobium-titanium composite oxide can be confirmed by X-ray diffraction (XRD).

The monoclinic niobium-titanium composite oxide is represented by the general formula $Ti_{1-x}M1_xNb_{2-y}M2_yO_7$. In the general formula, $0 \leq x < 1$, and $0 \leq y < 1$ are set. The elements M1 and M2 are at least one selected from the group consisting of V, Ta, Fe, Bi, Sb, As, P, Cr, Mo, W, B, Na, Mg, Al, and Si.

As the element M1, it is preferable to use at least one element of Fe and Al. These elements are trivalent elements. Therefore, the use of these elements as the element M1 makes it possible to improve the electron conductivity of the monoclinic niobium-titanium composite oxide. Therefore, the use of these elements as the element M1 makes it possible to improve the capacity and rapid charge performance of the negative electrode.

From the viewpoint of improving electron conductivity, it is more preferable to use at least one element selected from the group consisting of V, Ta, Bi, Sb, As, and P as the element M1. Since these elements are pentavalent elements, the electron conductivity of the monoclinic niobium-titanium composite oxide can be further improved.

As the element M1, it is preferable to use at least one element selected from the group consisting of B, Na, Mg, and Si. The atomic weights of these elements are smaller than the atomic weight of Ti. Therefore, the use of these elements as the element M1 makes it possible to increase the capacity of the negative electrode.

As the element M2, it is preferable to use at least one element selected from the group consisting of Cr, Mo, and W. Since these elements are hexavalent elements, the electron conductivity of the monoclinic niobium-titanium composite oxide can be improved.

The use of Ta as the element M2 makes it possible to obtain a monoclinic niobium-titanium composite oxide having the same performance as that in the case of using Nb as the element M2. This is considered to be because Nb and Ta have the same physical, chemical, and electrical properties.

As the elements M1 and M2, at least one element selected from the group consisting of Mo, W, and V may be used. These elements exhibit an effect as a sintering auxiliary agent. Therefore, the use of these elements as at least one of M1 and M2 makes it possible to lower a firing temperature in producing the monoclinic niobium-titanium composite oxide.

The monoclinic niobium-titanium composite oxide can also be represented by the general formula $Ti_{1-x}M_xNb_2O_7$ ($0 \leq x < 1$). M in the general formula is the same as M1 described above.

The content of the elements M1 and M2 in the compound represented by the general formula $Ti_{1-x}M1_xNb_{2-y}M2_yO_7$ and the content of the element M in the compound represented by the general formula $Ti_{1-x}M_xNb_2O_7$ can be quantified, for example, by ICP spectroscopic analysis.

The monoclinic niobium-titanium composite oxide may contain an oxide having a composition which is beyond a stoichiometric ratio represented by the general formula $Ti_{1-x}M1_xNb_2M2_yO_7$ ($0 \leq x < 1$, $0 \leq y < 1$). The oxide can be represented by the general formula $Ti_{1-x}M1_xNb_{2-y}M2_yO_{7\alpha\delta}$ ($0 \leq x < 1$, $0 \leq y < 1$, $-0.3 \leq \delta \leq 0.3$).

That is, during the preparation of the monoclinic niobium-titanium composite oxide, oxygen defects may occur in a raw material or an intermediate product. Inevitable impurities contained in the raw material as well as impurities mixed therein during the preparation may be present in the composite oxide. Due to the unavoidable factor, a monoclinic niobium-titanium composite oxide containing an oxide having a composition beyond a stoichiometric ratio may be prepared in some cases. The oxide having a composition beyond a stoichiometric ratio has excellent lithium ion insertion stability as with an oxide having a composition having a stoichiometric ratio. Therefore, even when the monoclinic niobium-titanium composite oxide contains the oxide having a composition beyond a stoichiometric ratio, the influence on the lithium ion insertion capacity is small.

The monoclinic niobium-titanium composite oxide may contain different phases with different Nb/Ti ratios. Examples of the different phases include Rutile type $TiO_2$, $Nb_{24}TiO_{62}$, $Nb_{14}TiO_{37}$, and $Nb_{10}Ti_2O_{29}$.

As the monoclinic niobium-titanium composite oxide particles 501, only one kind of monoclinic niobium-titanium composite oxide particles may be used, and mixtures of a plurality of kinds of monoclinic niobium-titanium composite oxides may be used.

(Amorphous Carbon Body)

The amorphous carbon body 502 covers at least a part of the surfaces of the monoclinic niobium-titanium composite oxide particles 501. It is preferable that the amorphous carbon body 502 uniformly coats the entire surfaces of the monoclinic niobium-titanium composite oxide particles 501. The amorphous carbon body 502 may have a film shape or a particle shape.

The amorphous carbon body 502 is a porous body capable of making lithium ions and a nonaqueous solvent contained in a nonaqueous electrolyte permeate. The electron conductivity of the amorphous carbon body 502 is higher than the electron conductivity of the monoclinic niobium-titanium composite oxide particles 501. Therefore, the amorphous carbon body 502 promotes the generation of a coating film SEI on the surfaces of the negative electrode active material particles 50 during the initial charge of the battery.

That is, the coating film SEI provided on the amorphous carbon body 502 supported on the surfaces of the monoclinic niobium-titanium composite oxide particles 501 tends to have a larger film thickness and higher film thickness uniformity than those of the coating film provided on the surfaces of the negative electrode active material particles 50 not supporting the amorphous carbon body 502.

The thickness of the amorphous carbon body 502 is preferably 1 nm to 10 nm, and more preferably 2 nm to 10 nm. The excessively thick amorphous carbon body 502 tends to inhibit the diffusion of lithium ions, which tends to increase the internal resistance of the negative electrode. The excessively thin amorphous carbon body 502 tends to be less likely to form the coating film SEI. Therefore, the use of a negative electrode having the excessively thick or excessively thin amorphous carbon body 502 tends to cause declining in the cycle characteristics of the battery.

The state and thickness of the amorphous carbon body 502 can be confirmed with transmission electron microscopy (TEM) observation. Specifically, first, ruthenium is adsorbed on the surfaces of the negative electrode active material particles 50 by an evaporation method. Then, the negative electrode active material particles 50 are embedded in a resin, and the resin is thinned by ion milling using DualMill 600 manufactured by GATAN. Then, primary particles of arbitrary negative electrode active material particles 50 are subjected to TEM observation. This observation allows the dispersibility of the amorphous carbon body 502 on the negative electrode active material particles 50 to be grasped. 10 or more particles are subjected to the observation, and the average value of the thickness of the amorphous carbon body 502 is calculated as the thickness of the amorphous carbon body 502. As a TEM apparatus, for example, H-9000UHR III manufactured by Hitachi, Ltd. can be used. In this measurement, an accelerating voltage is set to 300 kV, and an image magnification is set to a 2000000-fold magnification.

The amorphous carbon body 502 is made of carbon having low crystallinity. The amorphous carbon body 502 may contain a graphitic crystal structure. The crystallinity of the amorphous carbon body 502 can be grasped by Raman spectroscopic analysis. That is, the ratio $I_G/I_D$ of peak intensity $I_G$ of a G band and peak intensity $I_D$ of a D band for the negative electrode active material particles 50 obtained by Raman spectroscopic measurement is preferably 1.2 or less, more preferably 1.1 or less, and still more preferably 1.0 or less.

Here, the G band is a peak found within the range of 1530 $cm^{-1}$ to 1630 $cm^{-1}$ on the Raman spectrum. The G band is derived from the graphite structure of the amorphous carbon body 502. The D band is a peak found within the range of 1280 $cm^{-1}$ to 1380 $cm^{-1}$ on the Raman spectrum. The D band is derived from the amorphous structure of the amorphous carbon body 502. On this Raman spectrum, a peak derived from the monoclinic niobium-titanium composite oxide particles 501 does not substantially appear at the positions of the G band and D band.

Therefore, the low ratio $I_G/I_D$ of the negative electrode active material particles 50 obtained by Raman spectrometry means that the crystallinity of the amorphous carbon body 502 is low. The lower limit value of the ratio $I_G/I_D$ is not particularly limited, but it is, for example, 0.8 or more.

This Raman spectrum can be obtained by subjecting the negative electrode active material particles 50 to microscopic Raman spectroscopy. As a measuring apparatus, for example, Nicolet Almega (registered trademark) manufactured by Thermo Fisher Scientific can be used. In the measurement, for example, the wavelength of a measurement light source is set to 532 nm; a slit size is set to 25 μm;

laser intensity is set to 10%; an exposure time is set to 5 seconds; and the cumulated number is set to 10. The obtained Raman spectrum is subjected to peak fitting according to a method of least squares within a measurement range of 1100 cm$^{-1}$ to 2000 cm$^{-1}$. As a fitting function, a Gauss-Lorentz function is used.

The negative electrode active material-containing layer 500 may contain other oxides as a negative electrode active material other than the negative electrode active material particles 50 containing the monoclinic niobium-titanium composite oxide particles 501 and the amorphous carbon body 502.

Examples of the other oxides include a titanium oxide having a monoclinic structure, a titanium oxide having a rutile structure, and a titanium oxide having an anatase structure. The titanium oxide having each crystal structure can be represented by $TiO_2$ as an uncharged composition and $Li_xTiO_2$ (x is $0 \leq x \leq 1$) as a charged composition. The uncharged structure of the titanium oxide having a monoclinic structure can be represented as $TiO_2(B)$.

Examples of the other oxides include a lithium titanium oxide having a spinel structure (for example, the general formula $Li_{4+x}Ti_5O_{12}$ ($-1 \leq x \leq 3$)), a lithium titanium oxide having a ramsdellite structure (for example, $Li_{2+x}Ti_3O_7$ ($-1 \leq x \leq 3$), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$). Examples of the lithium titanium oxide include a lithium titanium composite oxide in which dopant is introduced into the lithium titanium oxide having a spinel structure or a ramsdellite structure.

Examples of the other oxides include an orthorhombic Na-containing niobium titanium composite oxide represented by the general formula $Li_{2+v}Na_{2-w}M1_xTi_{6-y-z}Nb_yM2_zO_{14+\delta}$ ($0 \leq v \leq 4$, $0 < w < 2$, $0 \leq x < 2$, $0 < y \leq 6$, $0 \leq z < 3$, $y+z < 6$, $-0.5 \leq \delta \leq 0.5$; M1 contains at least one selected from Cs, K, Sr, Ba, and Ca; and M2 contains at least one selected from Zr, Sn, V, Ta, Mo, W, Fe, Co, Mn, and Al).

(Coating Film)

The coating film SEI covers at least a part of the surface of the negative electrode. It is preferable that the coating film SEI covers at least a part of the surface of the negative electrode active material-containing layer 500. It is more preferable that the coating film SEI covers at least a part of the surface of the amorphous carbon body 502 of the negative electrode active material particles 50. The coating film SEI may cover at least a part of the surface of the negative electrode active material particles 50 on which the amorphous carbon body 502 is not supported.

The coating film SEI is a porous body which makes the lithium ions to permeate and is less likely to make the nonaqueous solvent of the nonaqueous electrolyte to permeate. This coating film SEI plays the same role as that of the SEI provided on the surface of the above-mentioned negative electrode containing graphite. That is, the coating film SEI plays a passive role, and suppresses further decomposition of the nonaqueous electrolyte in the negative electrode.

The coating film SEI contains a decomposition product of at least one of an electrolyte salt and a nonaqueous solvent. This decomposition product contains an organic compound. The organic compound is mainly produced by the decomposition of a nonaqueous solvent. Examples of the organic compound include $(CH_2OCO_2Li)_2$, lithium alkyl carbonate $(ROCO_2Li)$, lithium carbonate $(Li_2CO_3)$, or mixtures thereof. Here, R is a hydrocarbon group.

The thickness and uniformity of the coating film SEI can be grasped by the ratio S2/S1 of the carbon atom concentration S2 to the niobium atom concentration S1 obtained by subjecting the surface of the negative electrode to X-ray photoelectron spectroscopy (XPS).

That is, on the spectrum of the surface of the negative electrode obtained by XPS, a peak related to Nb3d is derived from niobium contained in the monoclinic niobium-titanium composite oxide. The peak related to Nb3d is observed within the range of 204 eV to 212 eV. A niobium atom concentration S1 calculated from the intensity of the peak area related to Nb3d is considered to correlate with the area of the surface of the negative electrode active material-containing layer 500 which is not covered with the amorphous carbon body 502 and the coating film SEI.

The niobium atom concentration S1 obtained by the XPS analysis is, for example, 3 atm % or less, preferably 2.5 atm % or less, and more preferably 1.5 atm % or less. The lower limit value of the niobium atom concentration S1 is not particularly limited, but it is 0.1 atm % or more as an example.

On the spectrum of the surface of the negative electrode obtained by XPS, a peak assigned to a C—O bond, a peak assigned to a C=O bond, a peak assigned to a C(=O)—O bond, and a peak assigned to a $CO_3^{2-}$ bond are relate to C1s and appear within the range of 286 eV to 294 eV. The peaks related to C1s are derived from carbon contained in the coating film SEI.

The peak assigned to the C—O bond appears within the range of 286 eV to 287.5 eV. The peak assigned to the C=O bond appears within the range of 287.5 eV to 289 eV and appears at a higher binding energy position than that of the peak assigned to the C—O bond. The peak assigned to the C(=O)—O bond appears within the range of 289 eV to 290 eV and appears at a higher binding energy position than that of the peak assigned to the C=O bond. The peak assigned to the $CO_3^{2-}$ bond appears within the range of 290 eV to 292 eV and appears at a higher binding energy position than that of the peak assigned to the C(=O)—O bond. Two peaks assigned to the $CO_3^{2-}$ bond may be detected within the range of the above binding energy. In this case, the total of the intensities of the two peak areas is taken as the peak assigned to the $CO_3^{2-}$ bond.

A carbon atom concentration S2 calculated from the total of the intensities of these peak areas is considered to correlate with the area and thickness of the coating film SEI on the negative electrode surface.

The carbon atom concentration S2 obtained by the XPS analysis is, for example, 9 atm % to 25 atm %, preferably 10 atm % to 22 atm %, and more preferably 13 atm % to 22 atm %.

The large ratio S2/S1 of the carbon atom concentration S2 to the niobium atom concentration S1 means that the coating film SEI formed on the surfaces of the negative electrode active material particles 50 is thick or the coating film SEI covers most of the surfaces of the negative electrode active material particles 50. This small ratio S2/S1 means that the coating film SEI formed on the surfaces of the negative electrode active material particles 50 is thin or the coating film SEI covers only a part of the surfaces of the negative electrode active material particles 50.

In the battery according to the first embodiment, the ratio S2/S1 is from 5 to 100. In the vicinity of the surface of the negative electrode in which the ratio S2/S1 is within this range, the coating film SEI having a film thickness sufficient for suppressing further reductive decomposition of the nonaqueous electrolyte can be said to be relatively uniformly provided on the surfaces of the negative electrode active material particles 50. Therefore, in the negative electrode in which the ratio S2/S1 is within this range, further reductive decomposition of the nonaqueous electrolyte is less likely to occur, and internal resistance tends to be small. The ratio S2/S1 is preferably 10 to 100, and more preferably 20 to 100.

The coating film SEI preferably further contains an inorganic compound in addition to the organic compound. This inorganic compound is generated mainly by the decomposition of the electrolyte salt. When the coating film SEI further contains the inorganic compound, further reductive decomposition of the nonaqueous electrolyte is less likely to occur. When the coating film SEI contains the inorganic compound, the coating film SEI may be a composite of an organic compound and an inorganic compound. The inorganic compound has a bond represented by $PF_xO_y$. Here, $0 \leq x \leq 1$ and $0 < y \leq 1$ are set.

The content of the inorganic compound in the coating film SEI can be grasped by XPS. That is, on the spectrum of the surface of the negative electrode obtained by X-ray photoelectron spectroscopy, a peak related to P2p, appearing within the range of 133 eV to 137 eV, and assigned to a $PF_xO_y$ bond is derived from phosphorus contained in the coating film SEI.

The peak assigned to the $PF_xO_y$ bond may appears within the range of 132 eV to 136 eV. A phosphorus atom concentration S3 calculated from an intensity of the peak area is considered to correlate with the amount of the inorganic compound contained in the coating film SEI provided on the surface of the negative electrode.

A plural peaks assigned to the $PF_xO_y$ bond may be detected within the range of 132 eV to 136 eV. In this case, the phosphorus atom concentration S3 can be calculated from the total of the intensities of the plural peak areas detected within the range of 132 eV to 136 eV.

The phosphorus atom concentration S3 obtained by the XPS analysis is, for example, 0.4 atm % to 3 atm %, and preferably 0.5 atm % to 3 atm %.

The ratio S3/S1 of the phosphorus atom concentration S3 to the niobium atom concentration S1 is preferably 0.3 to 20. The coating film SEI having a high effect of suppressing further reductive decomposition of the electrolyte can be said to be provided on at least a part of the surface of the negative electrode in which the ratio S3/S1 is within this range. This ratio S3/S1 is more preferably 0.4 to 10.

This XPS analysis can be performed by the following method.

First, a secondary battery is brought into a complete discharge state. Here, the complete discharge state means a state where lithium ions are completely released from a negative electrode active material. Specifically, the battery is discharged at a discharge rate of 0.2 C, and brought into an over-discharge state. A cutoff voltage is set to 1.0 V. Then, in a glove box filled with argon, the battery is disassembled, and a negative electrode is taken out.

The XPS analysis is preferably performed on batteries at the initial stage of shipping. That is, in a battery repeatedly charged and discharged, a coating film SEI may be excessively formed on the surface of a negative electrode, or an element derived from a positive electrode active material eluted into an electrolyte by a side reaction may be contained in the coating film SEI on the surface of the negative electrode. Therefore, in order to accurately grasp the state of the coating film SEI on the surface of the negative electrode, the XPS analysis is preferably performed on batteries with a small number of charge-and-discharge cycles at the initial stage of shipping. Therefore, the XPS analysis is more preferably performed in a state where a battery immediately after production, for example, a battery subjected to a degassing treatment, and then resealed is disassembled.

Next, the taken-out negative electrode is thoroughly washed with a nonaqueous solvent such as ethyl methyl carbonate, to remove lithium ions remaining in the negative electrode. When the lithium ions remain in the negative electrode, the lithium ions may react with the electrolyte to generate lithium carbonate and lithium fluoride or the like. When these impurities are contained in the coating film SEI, the composition of the coating film SEI may be changed. Therefore, it is preferable to completely remove the lithium ions in the negative electrode. In this series of operations, the negative electrode is not exposed to air.

Next, two test pieces are cut out from the surface of the washed negative electrode. The shape of the test piece is, for example, a square having a side length of 2 cm. Next, one of the test pieces is used as a negative electrode to form a half cell. As a counter electrode and reference electrode of the half cell, a lithium metal is used. Next, in the half cell, a negative electrode potential with reference to the reference electrode is measured. It is confirmed that the negative electrode potential with reference to the reference electrode is 2.0 V (vs. $Li^+/Li$) or more, that is, the negative electrode active material is completely discharged.

Next, the other test piece is set in an XPS apparatus so as not to be exposed to air. Then, the test piece is subjected to XPS measurement to obtain an XPS spectrum. As the XPS apparatus, for example, Quantera (registered trademark) SXM manufactured by ULVAC-PHI can be used. For the measurement, for example, monochromatized Al $K\alpha_{1,2}$ rays are used as excited X-rays; an X-ray irradiation diameter is set to 200 μm; and a photoelectron escape angle is 45 degrees. As analysis software, PHI Multipak can be used. For data processing, 9-point smoothing is performed, and the reference value of horizontal axis correction is set to 458.8 eV. The reference value is a peak position related to Ti2p derived from $TiO_2$. For spectrum fitting, a Gauss-Lorents function is used as a fitting function; a Shirley method is used as a background processing method; and a least squares method is used as a fitting method.

Next, the XPS spectrum is subjected to wide scan analysis, and elements contained in a measurement region are confirmed. Examples of the elements observed by the wide scan analysis include Li, P, F, O, C, Nb, and Ti. Next, all the elements observed by the wide scan analysis are subjected to narrow scan analysis to obtain a narrow scan spectrum related to each element. Then, the narrow scan spectrum of each element is subjected to fitting to obtain the area intensity of each element. The atomic concentration of each element can be calculated by multiplying the area intensity of the element by a relative sensitivity coefficient corresponding to each element.

Next, the niobium atom concentration S1 is calculated by dividing the atomic concentration of the niobium element thus obtained by the total of the atomic concentrations of the respective elements.

Next, a narrow scan spectrum related to C1s is subjected to peak separation. The narrow scan spectrum related to C1s may further include a peak derived from at least one of the conductive agent 51 and the binder 52 in addition to the peak derived from the coating film SEI described above. Examples of the peak derived from at least one of the conductive agent 51 and the binder 52 include a C—C bond and a $CH_x$ bond. The peak assigned to the C—C bond appears within the range of 286 eV to 282 eV and appears at a binding energy position lower than that of the peak assigned to the C—O bond. The peak assigned to the $CH_x$ bond appears within the same range as that of the peak assigned to the C—C bond.

Among all the peaks related to C1s thus observed, only the above-mentioned peak derived from the coating film SEI is extracted. The carbon atom concentration S2 derived from the organic compound contained in the coating film SEI is calculated from the total of the intensities of the peak areas derived from the coating film SEI and the relative sensitivity coefficient of carbon.

Next, a narrow scan spectrum related to P2p is subjected to peak separation. From the intensity of the peak area assigned to a $PF_xO_y$ bond and the relative sensitivity coefficient of phosphorus, the phosphorus atom concentration S3 derived from the inorganic compound contained in the coating film SEI is calculated.

By the above method, the ratios S2/S1 and S3/S1 can be obtained.

The film thickness of the coating film SEI is preferably 10 nm or more, more preferably 15 nm or more, and still more preferably 20 nm or more. When the film thickness of the coating film SEI is large, the effect of suppressing the decomposition of the electrolyte in the negative electrode is improved, and the cycle characteristics of the battery tend to be improved.

The film thickness of the coating film SEI is preferably 150 nm or less, more preferably 120 nm or less, and still more preferably 90 nm or less. When the film thickness of the coating film SEI is small, the diffusibility of lithium ions in the negative electrode tends to be improved and the internal resistance tends to be decreased.

The film thickness of the coating film SEI can be obtained by XPS depth direction analysis.

Specifically, first, a negative electrode is taken out from a battery in the same manner as that described in the above XPS spectrum measuring method to obtain a test piece. Then, this test piece is set in an XPS apparatus, and argon (Ar) ion etching and XPS measurement are alternately repeated. In this measurement, Li1s, C1s, F1s, P2p, and Nb3d are set as measurement targets; an etching rate is set to 7 nm/min with respect to silicon oxide ($SiO_2$); and XPS measurement is performed per minute. Then, the obtained spectrum is subjected to fitting to obtain the area intensity of each element. Then, the atomic concentration of the element is calculated from the area intensity of the element and the relative sensitivity coefficient of the element. Then, for each spectrum, the atomic concentration of Li1s in the total atomic concentration of Li1s, C1s, F1s, P2p and Nb3d is calculated. Then, among these spectra, a spectrum is confirmed, in which the atomic concentration related to Li1s is close to 1 atm % and higher than 1 atm % and which is obtained at the deepest position. Then, an etching depth is calculated from a time and an etching rate when the spectrum is obtained. The depth thus calculated can be regarded as the film thickness of the coating film SEI.

That is, as described above, the coating film SEI contains the decomposition products of the electrolyte salt and solvent contained in the electrolyte. These decomposition products contain lithium. As described above, in the negative electrode taken out in a complete discharge state, the lithium ions are completely separated from the negative electrode active material. Therefore, the peak related to Li1s detected by the XPS depth direction analysis can be said to be derived from the coating film SEI. From the above, it can be regarded that the coating film SEI exists up to a position where a peak indicating that the atomic concentration related to Li1s is higher than 1 atm % is obtained. Therefore, it can be regarded that the coating film SEI is provided up to the boundary between a depth at which a spectrum having an atomic concentration related to Li1s of higher than 1 atm % is obtained and a depth at which a spectrum having an atomic concentration related to Li1s of 1 atm % or less is obtained. Therefore, a depth at which a spectrum having an atomic concentration related to Li1s of close to 1 atm % and higher than 1 atm %, and obtained at the deepest position is obtained can be said to be regarded as the film thickness of the coating film SEI.

The conductive agent 51 is blended to improve current collection performance and to suppress the contact resistance between the negative electrode active material particles 50 and the current collector. Examples of the conductive agent 51 include carbonaceous materials such as vapor grown carbon fiber (VGCF), acetylene black, carbon black, and graphite. One of these may be used as the conductive agent 51, or two or more thereof may be used in combination as the conductive agent 51. Alternatively, in place of using the conductive agent 51, a carbon coating or an electron conductive inorganic material coating may be applied to the surfaces of the negative electrode active material particles 50. The conductive agent 51 may be omitted.

The binder 52 is blended to fill the gaps of the dispersed negative electrode active material particles 50 with the binder 52 and also to bind the negative electrode active material particles 50 and the negative electrode current collector. Examples of the binder 52 include polytetrafluoro ethylene (PTFE), polyvinylidene fluoride (PVdF), fluorine-containing rubber, styrene-butadiene rubber, a polyacrylic acid compound, and an imide compound. One of these may be used as the binder 52, or two or more thereof may be used in combination as the binder 52.

From the viewpoint of improving the cycle characteristics, it is preferable to use carboxymethyl cellulose, a polyacrylic acid compound, or a mixture thereof as the binder 52. The carboxymethyl cellulose and the polyacrylic acid compound have high coatability of the surfaces of the negative electrode active material particles 50. Therefore, the use of the carboxymethyl cellulose and the polyacrylic acid compound as the binder 52 makes it possible to suppress the decomposition of the electrolyte in the surfaces of the negative electrode active material particles 50 which is not covered with the amorphous carbon body 502. The binder 52 may be omitted.

It is preferable that the negative electrode active material particles 50, the conductive agent 51, and the binder 52 are respectively blended at rates of 68% by mass to 96% by mass, 2% by mass to 30% by mass, and 2% by mass to 30% by mass, in the negative electrode active material-containing layer. The content of the conductive agent 51 of 2% by mass or more makes it possible to improve the current collection performance of the negative electrode active material-containing layer. The amount of the binder 52 of 2% by mass or more provides sufficient binding property between the negative electrode active material-containing layer and the negative electrode current collector, which can provide promising excellent cycle performance. On the other hand, the contents of the conductive agent 51 and binder 52 are preferably 28% by mass or less, thereby increasing the capacity.

The negative electrode current collector is a material which is electrochemically stable at the insertion and extraction potentials of lithium ions of the negative electrode active material. The negative electrode current collector is preferably made of copper, nickel, stainless, aluminum, or an aluminum alloy containing one or more elements selected from Mg, Ti, Zn, Mn, Fe, Cu, and Si. The thickness of the negative electrode current collector is preferably 5 µm to 20 µm. The negative electrode current collector having such a thickness can achieve a balance between the strength and reduction in weight of the negative electrode.

The density of the negative electrode active material-containing layer (not including the current collector) is preferably 1.8 g/cm$^3$ to 2.8 g/cm$^3$. The negative electrode in which the density of the negative electrode active material-containing layer is within this range has an excellent energy density and retention property of the nonaqueous electrolyte. The density of the negative electrode active material-containing layer is more preferably 2.1 g/cm$^3$ to 2.6 g/cm$^3$.

Next, an example of a method of producing a secondary battery including the negative electrode will be described.

First, negative electrode active material particles 50 are prepared. Specifically, first, monoclinic niobium-titanium composite oxide particles 501 are prepared. Examples of a method of producing the monoclinic niobium-titanium composite oxide particles 501 include a solid phase method, a hydrothermal method, a sol-gel method, and a coprecipitation synthesis method.

Next, the monoclinic niobium-titanium composite oxide particles 501, a carbon source, and pure water are mixed and thoroughly stirred to prepare a dispersion solution.

As the carbon source, sugars such as sucrose, maltose and glucose, polyolefins, nitriles, alcohols such as polyvinyl alcohol (PVA), organic compounds containing a benzene ring, aromatic hydrocarbons such as pyrene, naphthalene and chrysene, or mixtures thereof can be used. As the carbon source, PVA is preferably used. The use of the PVA as the carbon source tends to provide an improvement in the dispersibility of the amorphous carbon body 502 on the surfaces of the monoclinic niobium-titanium composite oxide particles 501.

From the viewpoint of improving the cycle characteristics of the battery, the addition amount of the carbon source is preferably 1.0 part by mass or more, and more preferably 2.0 parts by mass or more with respect to 100 parts by mass of the monoclinic niobium-titanium composite oxide particles 501. When the addition amount of the carbon source is increased, the film thickness of the amorphous carbon body 502 is increased, which tends to cause an increase in the film thickness of the coating film SEI.

From the viewpoint of lowering the internal resistance of the negative electrode, the addition amount of the carbon source is preferably 15 parts by mass or less, and more preferably 10 parts by mass or less with respect to 100 parts by mass of the monoclinic niobium-titanium composite oxide particles 501. When the addition amount of the carbon source is decreased, the film thickness of the amorphous carbon body 502 is decreased, which tends to cause a decrease in the film thickness of the coating film SEI.

Then, the dispersion solution is subjected to spray drying to obtain a powder sample. Then, the obtained powder sample is further dried at a temperature of 70° C. to 200° C. for 1 minute to 1 hour. Thus, the monoclinic niobium-titanium composite oxide particles 501 supporting the unfired amorphous carbon body 502 are obtained.

Then, the composite oxide particles are subjected to firing under an inert atmosphere to perform a carbonization treatment. As the gas for the inert atmosphere, for example, nitrogen gas, carbon dioxide gas, or argon gas or the like can be used. A firing time is set to, for example, 1 hour to 5 hours.

From the viewpoint of lowering the internal resistance of the negative electrode, a firing temperature is preferably 650° C. or higher, and more preferably 700° C. or higher. When the firing temperature is raised, the crystallinity of the amorphous carbon body 502 is improved, which tends to provide an improvement in the electron conductivity of the negative electrode active material particles 50.

From the viewpoint of improving the cycle characteristics of the battery, the firing temperature is preferably 850° C. or lower, and more preferably 800° C. or lower. When the firing temperature is lowered, the crystallinity of the amorphous carbon body 502 is decreased, which tends to provide an improvement in the effect of suppressing the decomposition of the electrolyte of the coating film SEI.

Thus, the negative electrode active material particles 50 can be obtained, which contains the monoclinic niobium-titanium composite oxide particles 501 having a surface of which at least a part is covered with the amorphous carbon body 502.

Next, a negative electrode is produced using the negative electrode active material particles 50 thus obtained. Specifically, first, the negative electrode active material particles 50, a conductive agent 51, and a binder 52 are suspended in a solvent, to prepare a slurry. Then, this slurry is applied to one surface or both surfaces of a negative electrode current collector. Then, the applied slurry is dried to obtain a laminate of the negative electrode current collector and negative electrode active material-containing layer. Thereafter, the laminate is pressed. Thus, the negative electrode can be obtained.

The negative electrode may be produced by the following method. First, negative electrode active material particles 50, a conductive agent 51, and a binder 52 are mixed to obtain a mixture. Then, the mixture is formed into a pellet shape. Then, by placing the pellets on a negative electrode current collector, the negative electrode can be obtained.

Next, a method of providing a coating film SEI on the surface of a negative electrode will be described. The coating film SEI can be provided on the surface of the negative electrode, for example, by a method including initial charge of a secondary battery, and aging after the initial charge.

Specifically, first, a secondary battery including the negative electrode obtained by the above-described method is produced. Then, this battery is initially charged. During the initial charge, a negative electrode potential is set to be lower than 1.0 V (vs. Li$^+$/Li). By the initial charge, a coating film SEI is formed on the surface of the negative electrode. The negative electrode potential during the initial charge is preferably set to 0.8 V (vs. Li$^+$/Li) or less, and more preferably 0.7 V (vs. Li$^+$/Li) or less. When the negative electrode potential during the initial charge is low, the film thickness of the coating film SEI tends to be increased. The lower limit value of the negative electrode potential during the initial charge is not particularly limited, and an example thereof is 0.6 V (vs. Li$^+$/Li). During the initial charge, the negative electrode potential is maintained at lower than 1.0 V (vs. Li$^+$/Li), for example, for 8 to 48 hours.

Then, the initially charged battery is subjected to aging. By the aging, the coating film SEI on the surface of the negative electrode grows. An aging temperature is preferably set to 25° C. to 60° C. An aging time is preferably set to 8 hours to 48 hours. When the aging temperature is high or the aging time is long, the coating film SEI formed on the surface of the negative electrode is likely to grow, and the film thickness of the coating film SEI tends to be increased.

The aged battery may be discharged, followed by a degassing treatment.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may include one kind of positive electrode active material, or alternatively, include two or more kinds of positive electrode active materials. Examples of the oxide and sulfide include compounds capable of having Li (lithium) and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $LiCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($LiNi_{1-x-y}Co_xMn_yO_2$; $0<x<1$, $0<y<1$, $x+y<1$). As the active material, one of these compounds may be used singly, or plural compounds may be used in combination.

More preferred examples of the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $LiNi_{1-y}Co_yO_2$; $0<x\leq1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($LiNi_{1-x-y}Co_xMn_yO_2$; $0<x<1$, $0<y<1$, $x+y<1$). The positive electrode potential can be made high by using these positive electrode active materials.

The primary particle size of the positive electrode active material is preferably within a range of from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably within a range of from 0.1 $m^2$/g to 10 $m^2$/g. The positive electrode active material having a specific surface area of 0.1 $m^2$/g or more can secure sufficient sites for inserting and extracting Li ions. The positive electrode active material having a specific surface area of 10 $m^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, and imide compounds. One of these may be used as the binder, or two or more may be used in combination as the binder.

The electro-conductive agent is added to improve a current collection performance and to suppress the contact resistance between the positive electrode active material and the positive electrode current collector. Examples of the electro-conductive agent include carbonaceous substances such as vapor grown carbon fiber (VGCF), acetylene black, carbon black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions within ranges of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the decomposition of a electrolyte can be reduced during storage under high-temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably within a range of from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode may be produced by the following method, for example. First, a positive electrode active material, an electro-conductive agent, and a binder are suspended in a solvent to prepare a slurry. The slurry is applied onto one surface or both of reverse surfaces of a positive electrode current collector. Next, the applied slurry is dried to form a layered stack of the positive electrode active material-containing layer and the positive electrode current collector. Then, the layered stack is subjected to pressing. The positive electrode can be produced in this manner. Alternatively, the positive electrode may also be produced by the following method. First, a positive electrode active material, an electro-conductive agent, and a binder are mixed to obtain a mixture. Next, the mixture is formed into pellets. Then the positive electrode can be obtained by arranging the pellets on the positive electrode current collector.

3) Electrolyte

As the electrolyte, for example, a nonaqueous electrolyte may be used. As the nonaqueous electrolyte, a liquid nonaqueous electrolyte or a gel nonaqueous electrolyte may be used. The liquid nonaqueous electrolyte is prepared by dissolving an electrolyte salt in an organic solvent. The concentration of the electrolyte salt is preferably 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethansulfonate ($LiCF_3SO_3$), bistrifluoromethylsulfonylimide lithium (LiTFSI; $LiN (CF_3SO_2)_2$), lithium bis(pentafluorosulfonyl) imide (LiBETI; $LiN(SO_2C_2F_5)_2$), lithium bis(fluorosulfonyl)imide (LiFSI; $LiN(SO_2F)_2$), and lithium bis(oxalate) borate (LiBOB; $LiC_4BO_8$), and mixtures thereof. The electrolyte is preferably less likely to be oxidized even at high potentials, and $LiPF_6$ is most preferred.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel-like nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

The nonaqueous electrolyte may further contain at least one compound selected from the group consisting of vinylene carbonate (VC), fluoroethylene carbonate (FEC), and ethylene sulfite (ES) as an additive. The additive suppresses the decomposition of the nonaqueous electrolyte. The amount of the additive in the nonaqueous electrolyte is preferably 0.1% by mass to 5% by mass.

4) Separator

The separator may be made of, for example, a porous film or synthetic resin nonwoven fabric including polyethylene, polypropylene, cellulose, or polyvinylidene fluoride (PVdF). In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 1% by mass or less.

The shape of the container member is not particularly limited. The shape of the container member may be, for example, flat (thin), square, cylinder, coin, or button-shaped. Depending on battery size, the container member may be, for example, a container member for compact batteries installed in mobile electronic devices, or container member for large batteries installed on vehicles such as two- to four-wheel automobiles, railway cars, and the like.

6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

7) Positive Electrode Terminal

The positive electrode terminal may be made of, for example, a material that is electrically stable in the potential range of 3 V to 5 V (vs. $Li/Li^+$) relative to the oxidation-and-reduction potential of lithium, and has electrical conductivity. Examples of the material for the positive electrode terminal include aluminum and an aluminum alloy containing one or more selected from the group consisting of Mg, Ti, Zn, Mn, Fe, Cu, Si, and the like. The positive electrode terminal is preferably made of the same material as the positive electrode current collector, in order to reduce contact resistance with the positive electrode current collector.

Next, the secondary battery according to the second embodiment will be more specifically described with reference to the drawings.

Figure 4:
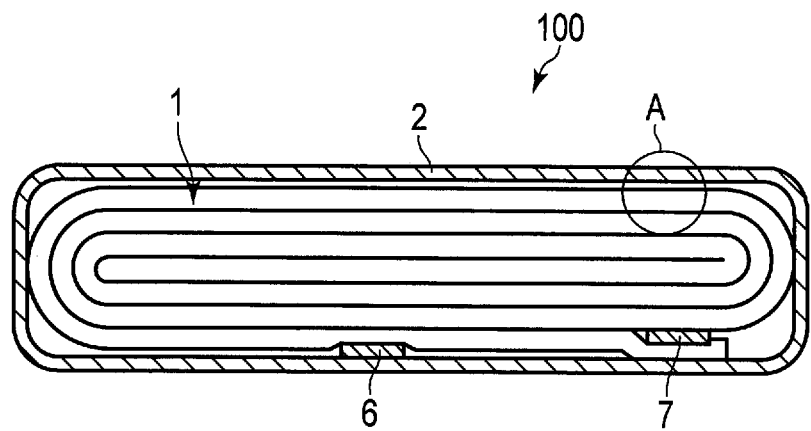
FIG. 4 is a cross-sectional view schematically showing an example of the secondary battery according to the first embodiment.
Figure 5:
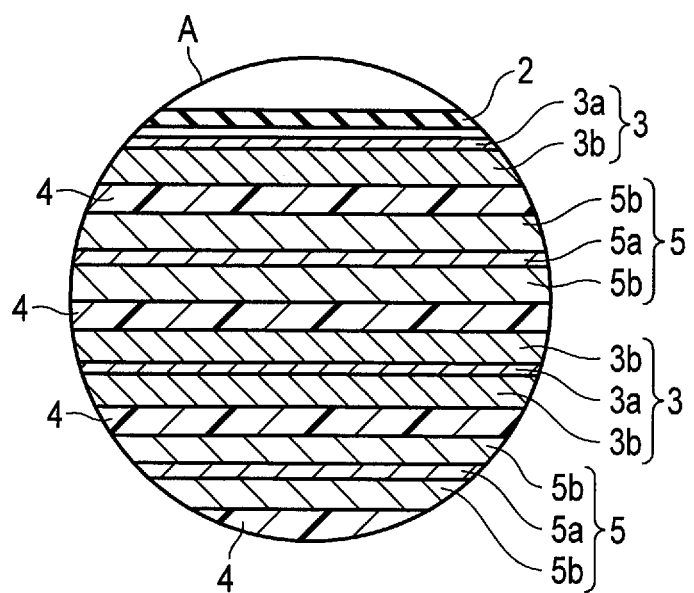
FIG. 5 is an enlarged cross-sectional view of a portion A of the secondary battery shown in FIG. 4.

FIG. 4 is a cross-sectional view schematically showing an example of a secondary battery according to the first embodiment. FIG. 5 is an enlarged cross-sectional view of section A of the secondary battery shown in FIG. 4.

The secondary battery 100 shown in FIGS. 4 and 5 includes a bag-shaped container member 2 shown in FIG. 4, an electrode group 1 shown in FIGS. 4 and 5, and an electrolyte, which is not shown. The electrode group 1 and the electrolyte are housed in the container member 2. The electrolyte (not shown) is held in the electrode group 1.

The bag shaped container member 2 is made of a laminate film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3a and a negative electrode active material-containing layer 3b. The active material according to the first embodiment is included in the negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 4, a negative electrode terminal 6 and positive electrode terminal 7 are positioned in vicinity of the outer peripheral edge of the wound electrode group 1. The negative electrode terminal 6 is connected to a portion of the negative electrode current collector 3a of the negative electrode 3 positioned outermost. The positive electrode terminal 7 is connected to the positive electrode current collector 5a of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

Figure 6:
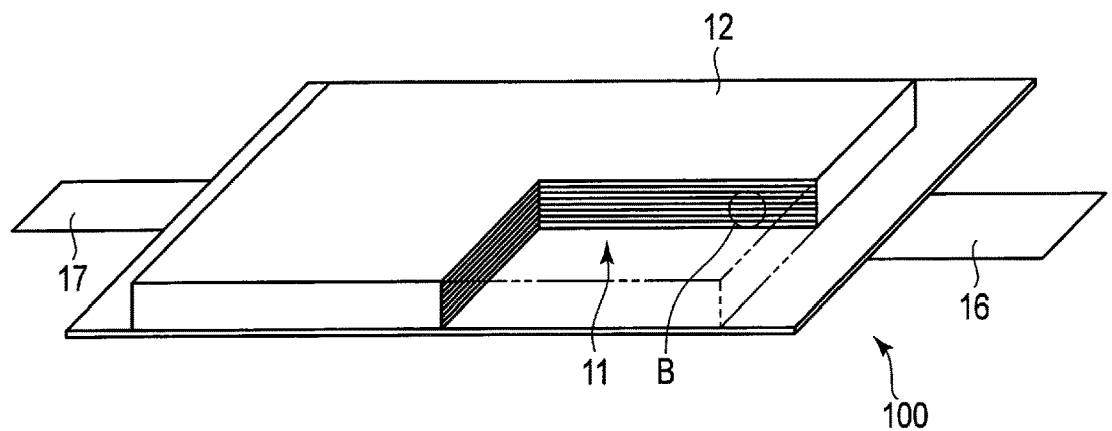
FIG. 6 is a partially cutaway perspective view schematically showing another example of the secondary battery according to the first embodiment.
Figure 7:
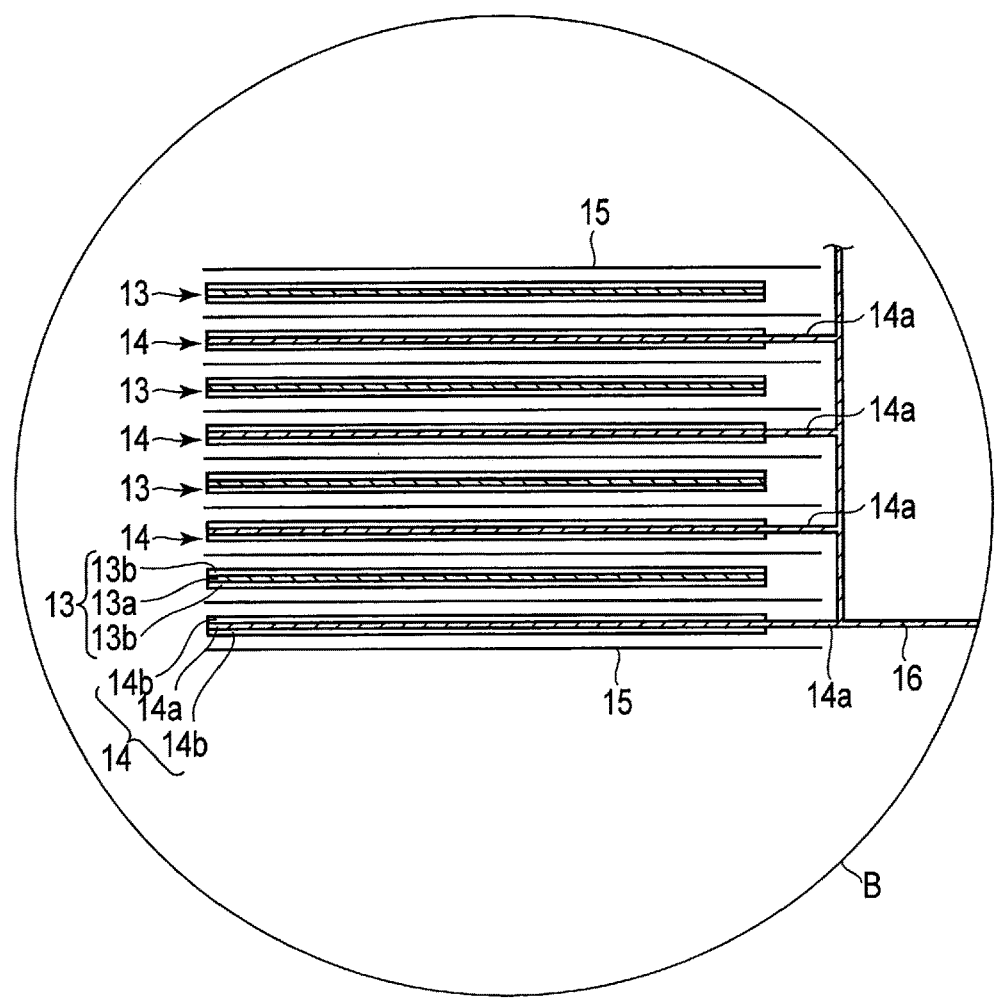
FIG. 7 is an enlarged cross-sectional view of a portion B of the secondary battery shown in FIG. 6.

The secondary battery according to the first embodiment is not limited to the secondary battery of the structure shown in FIGS. 4 and 5, and may be, for example, a battery of a structure as shown in FIGS. 6 and 7.

FIG. 6 is a partially cut-out perspective view schematically showing another example of a secondary battery according to the first embodiment. FIG. 7 is an enlarged cross-sectional view of section B of the secondary battery shown in FIG. 6.

The secondary battery 100 shown in FIGS. 6 and 7 includes an electrode group 11 shown in FIGS. 6 and 7, a container member 12 shown in FIG. 6, and an electrolyte, which is not shown. The electrode group 11 and the electrolyte are housed in the container member 12. The electrolyte is held in the electrode group 11.

The container member 12 is made of a laminate film including two resin layers and a metal layer sandwiched between the resin layers.

As shown in FIG. 7, the electrode group 11 is a stacked electrode group. The stacked electrode group 11 has a structure in which positive electrodes 13 and negative electrodes 14 are alternately stacked with separator(s) 15 sandwiched therebetween.

The electrode group 11 includes plural positive electrodes 13. Each of the plural positive electrodes 13 includes a positive electrode current collector 13a, and positive electrode active material-containing layers 13b supported on both of reverse surfaces of the positive electrode current collector 13a. The electrode group 11 includes plural negative electrodes 14. Each of the plural negative electrodes 14 includes a negative electrode current collector 14a, and negative electrode active material-containing layers 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of each positive electrode current collector 13a of the positive electrodes 13, which is positioned on the side opposite to the protruded end of the negative electrode current collector 14a, protrude out from the positive electrode 13. The positive electrode current collector 13a protruding out from the positive electrode 13 is electrically connected to a strip-shaped positive electrode terminal 17. The tip of the strip-shaped positive electrode terminal 17 is positioned on the opposite side from the negative electrode terminal 16, and extended out from the container member 12.

In the electrode and secondary battery according to the first embodiment, the ratio S2/S1 of the carbon atom concentration S2 to the niobium atom concentration S1 at the surface of the electrode obtained by X-ray photoelectron spectroscopy is from 5 to 100. On the surface of such an electrode, a favorable coating film is provided, which suppresses further reductive decomposition of the electrolyte and has low internal resistance.

Therefore, the use of such an electrode as the negative electrode can suppress further reductive decomposition of the electrolyte even when the lower limit value of the negative electrode potential during full charge is set to be lower than 1.0 V (vs. $Li^+/Li$). Therefore, the secondary battery according to the first embodiment including such a negative electrode can achieve a high energy density and excellent cycle characteristics.

Second Embodiment

According to a second embodiment, a battery module is provided. The battery module according to the second embodiment includes plural secondary batteries according to the first embodiment.

In the battery module according to the second embodiment, each of the single batteries may be arranged electrically connected in series, in parallel, or in a combination of in-series connection and in-parallel connection.

An example of the battery module according to the second embodiment will be described next with reference to the drawings.

FIG. 8 is a perspective view schematically showing an example of the battery module according to the second embodiment. A battery module 200 shown in FIG. 8 includes five single-batteries 100, four bus bars 21, a positive electrode-side lead 22, and a negative electrode-side lead 23. Each of the five single-batteries 100 is a secondary battery according to the first embodiment.

Each bus bar 21 connects a negative electrode terminal 6 of one single-battery 100 and a positive electrode terminal 7 of the single-battery 100 positioned adjacent. The five single-batteries 100 are thus connected in series by the four bus bars 21. That is, the battery module 200 shown in FIG. 8 is a battery module of five in-series connection.

As shown in FIG. 8, the positive electrode terminal 7 of the single-battery 100 located at one end on the left among the row of the five single-batteries 100 is connected to the positive electrode-side lead 22 for external connection. In addition, the negative electrode terminal 6 of the single-battery 100 located at the other end on the right among the row of the five single-batteries 100 is connected to the negative electrode-side lead 23 for external connection.

The battery module according to the second embodiment includes the secondary battery according to the first embodiment. Therefore, the battery module according to the second embodiment can achieve a high energy density and excellent cycle characteristics.

Third Embodiment

According to a third embodiment, a battery pack is provided. The battery pack includes a battery module according to the second embodiment. The battery pack may include a single secondary battery according to the first embodiment, in place of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the third embodiment will be described with reference to the drawings.

Figure 9:
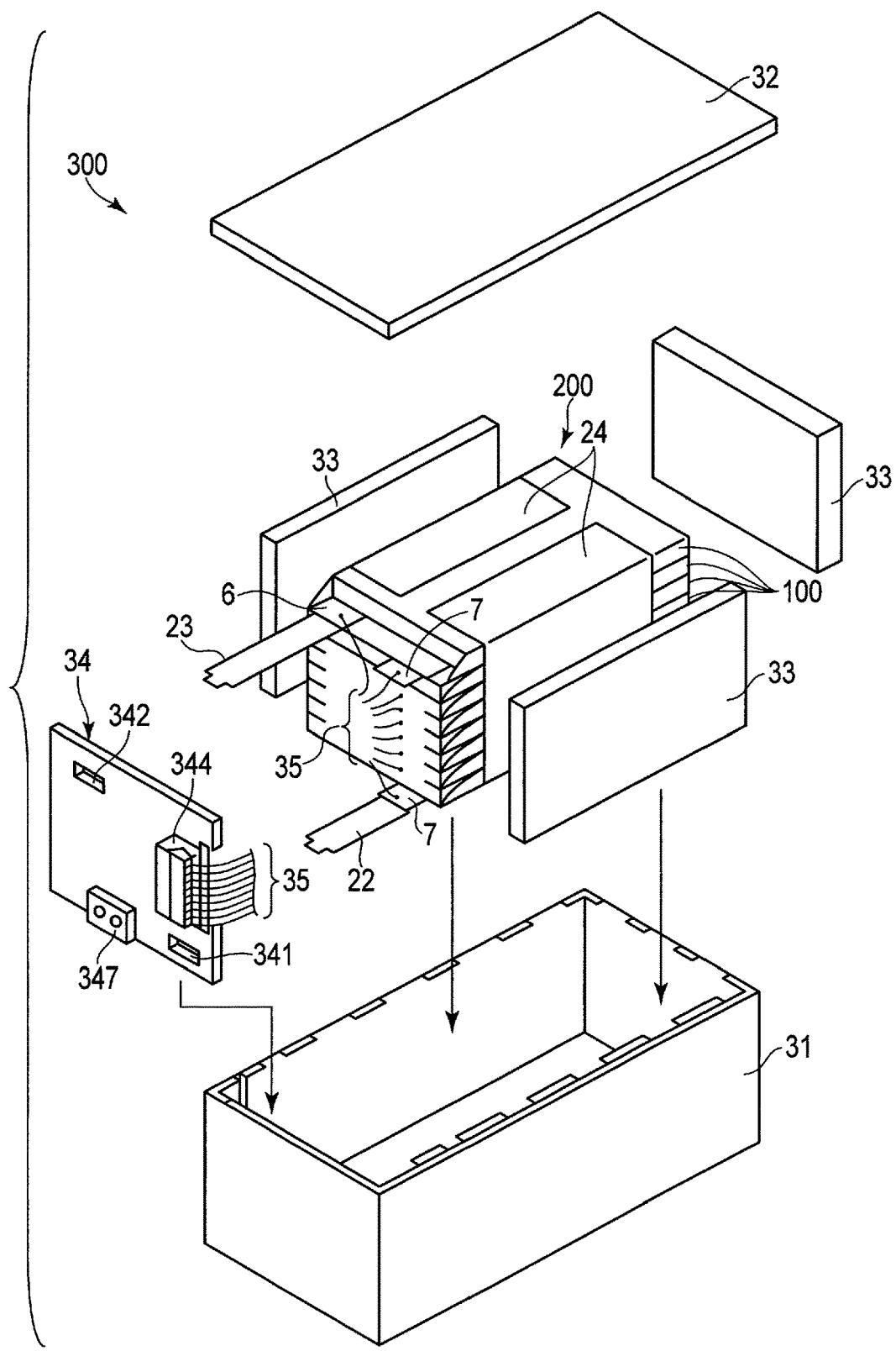
FIG. 9 shows an exploded perspective view showing an example of a battery pack according to a third embodiment.

FIG. 9 is an exploded perspective view schematically showing an example of the battery pack according to the third embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 is configured to house the protective sheets 33, the battery module 200, the printed wiring board 34, and the wires 35. The lid 32 covers the housing container 31 to house the battery module 200 and the like. Although not shown, opening(s) or connection terminal(s) for connecting to external device(s) and the like are provided on the housing container 31 and lid 32.

The protective sheets 33 are arranged on both inner surfaces of the housing container 31 along the long-side direction and on the inner surface along the short-side direction, facing the printed wiring board 34 across the battery module 200 positioned therebetween. The protective sheets 33 are made of, for example, resin or rubber.

The battery module 200 includes plural single-batteries 100, a positive electrode-side lead 22, a negative electrode-side lead 23, and an adhesive tape 24. The battery module 200 may alternatively include only one single-battery 100.

A single-battery 100 has a structure shown in FIGS. 6 and 7. At least one of the plural single-batteries 100 is a secondary battery according to the second embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective circuit 344 controls charge and discharge of the plural single-batteries 100. The protective circuit 344 is also configured to cut-off electric connection between the protective circuit 344 and the external power distribution terminal 347 to external devices, based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

Such a battery pack 300 is used, for example, in applications where excellent cycle performance is demanded when a large current is extracted. More specifically, the battery pack 300 is used as, for example, a power source for electronic devices, a stationary battery, an onboard battery for vehicles, or a battery for railway cars. An example of the electronic device is a digital camera. The battery pack 300 is particularly favorably used as an onboard battery.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

The battery pack according to the third embodiment includes the secondary battery according to the first embodiment or the battery module according to the second embodiment. Hence, the battery pack can exhibit a high energy density and is excellent in output performance and life performance at a high temperature.

The battery pack according to the third embodiment includes the secondary battery according to the first embodiment or the battery module according to the second embodiment. Therefore, the battery pack according to the third embodiment can achieve a high energy density and excellent cycle characteristics.

Fourth Embodiment

According to a fourth embodiment, a vehicle is provided. The battery pack according to the third embodiment is installed on this vehicle.

In the vehicle according to the fourth embodiment, the battery pack is configured, for example, to recover regenerative energy from motive force of the vehicle.

Examples of the vehicle according to the fourth embodiment include two- to four-wheeled hybrid electric automobiles, two- to four-wheeled electric automobiles, electric assist bicycles, and railway cars.

In the vehicle according to the fourth embodiment, the installing position of the battery pack is not particularly limited. For example, the battery pack may be installed in the engine compartment of the vehicle, in rear parts of the vehicle, or under seats.

An example of the vehicle according to the fourth embodiment is explained below, with reference to the drawings.

FIG. 11 is a cross-sectional view schematically showing an example of a vehicle according to the fourth embodiment.

A vehicle 400, shown in FIG. 11 includes a vehicle body 40 and a battery pack 300 according to the fourth embodiment.

In FIG. 11, the vehicle 400 is a four-wheeled automobile. As the vehicle 400, for example, two- to four-wheeled hybrid electric automobiles, two- to four-wheeled electric automobiles, electric assist bicycles, and railway cars may be used.

This vehicle 400 may have plural battery packs 300 installed. In such a case, the battery packs 300 may be connected in series, connected in parallel, or connected in a combination of in-series connection and in-parallel connection.

The battery pack 300 is installed in an engine compartment located at the front of the vehicle body 40. The location of installing the battery pack 300 is not particularly limited. The battery pack 300 may be installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 12, an aspect of operation of the vehicle according to the fourth embodiment is explained.

FIG. 12 is a view schematically showing another example of the vehicle according to the fourth embodiment. A vehicle 400, shown in FIG. 12, is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (for example, VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the first embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 12) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fourth embodiment includes the battery pack according to the third embodiment. Therefore, the vehicle according to the fourth embodiment can achieve a long life and a long travelable distance.

EXAMPLES

Examples of the present embodiment will be described below. The present invention is not limited to Examples described below without departing from the spirit of the present invention.

Example 1

(Preparation of Monoclinic Niobium-Titanium Composite Oxide)

A monoclinic niobium-titanium composite oxide was prepared by a solid phase method. Specifically, first, a powder of titanium dioxide ($TiO_2$) and a powder of niobium pentoxide ($Nb_2O_5$) were mixed to obtain a mixture. In the mixture, the molar ratio of niobium and titanium was 1:1.

Then, this mixture was mixed with ethanol to obtain a mixed solution. Then, this mixed solution was pulverized using a wet ball mill to obtain a primary pulverized sample.

Then, the mixed solution after pulverizing was filtered, and the filtered primary pulverized sample was dried. Then, the dried primary pulverized sample was placed in an alumina crucible and subjected to temporary firing at a temperature of 1000° C. for 12 hours.

Then, the powder sample thus obtained was mixed with ethanol to obtain a mixed solution. Then, this mixed solution was pulverized using a wet ball mill to obtain a secondary pulverized sample.

Then, the mixed solution after pulverizing was filtered, and the filtered secondary pulverized sample was dried. Then, the dried secondary pulverized sample was placed in an alumina crucible and subjected to main firing at a temperature of 1100° C. for 12 hours.

Then, the secondary pulverized sample after main firing was further pulverized to obtain a powder.

When the powder thus obtained was subjected to XRD measurement, the intensities and 2θ values of all peaks indicated on the obtained XRD pattern were sufficiently consistent with the intensities and 2θ values of peaks described in PDF No. 01-077-1374. Accordingly, this powder was confirmed to be a monoclinic niobium-titanium composite oxide having a single phase structure assigned to a $Nb_2TiO_7$ phase.

The average particle size of the monoclinic niobium-titanium composite oxide was measured by the same method as the method of measuring the primary particle size of the negative electrode active material particles, and the primary particle size (d50) thereof was 0.6 μm.

(Preparation of Negative Electrode Active Material)

Next, a negative electrode active material was prepared. Specifically, first, the powder of the monoclinic niobium-titanium composite oxide obtained by the above-described method, sucrose, and pure water were mixed to obtain a dispersion. In this dispersion, the concentration of a solute obtained by totalizing the powder of the monoclinic niobium-titanium composite oxide and sucrose was 10% by mass. The addition amount of sucrose was 3.5 parts by mass with respect to 100 parts by mass of the monoclinic niobium-titanium composite oxide.

Then, this dispersion was subjected to spray drying to obtain a powder sample. Then, the obtained powder sample was dried at a temperature of 100° C. for 12 hours to sufficiently volatilize a solvent. Thus, monoclinic niobium-titanium composite oxide particles supporting an unfired amorphous carbon body were obtained.

Then, this composite oxide was fired under an inert atmosphere at a temperature of 700° C. for 1 hour to carry out a carbonization treatment. Thus, negative electrode active material particles containing the film-like amorphous carbon body were obtained.

(Production of Negative Electrode)

First, the negative electrode active material particles obtained by the above-described method, graphite, carboxymethyl cellulose (CMC), styrene butadiene rubber (SBR), and pure water were mixed to obtain a slurry. The mass ratio of the negative electrode active material particles, graphite, CMC and SBR in this slurry was 100:10:5:5.

Then, the slurry was applied to both surfaces of an aluminum foil. The thickness of the aluminum foil was 12 μm. Then, the applied slurry was dried to form a negative electrode active material-containing layer on a negative electrode current collector. Thereafter, this was pressed to obtain a negative electrode. In this negative electrode, the negative electrode current collector included a portion not supporting the negative electrode active material-containing layer, that is, a current collector tab.

(Production of Positive Electrode)

First, a $LiNi_{0.5}Co_{0.2}Mn_{0.3}O_2$ powder, acetylene black, a carbon nanofiber, polyvinylidene fluoride (PVdF), and N-methylpyrrolidone (NMP) were mixed to obtain a slurry. The mass ratio of the $LiNi_{0.5}Co_{0.2}Mn_{0.3}O_2$ powder, acetylene black, carbon nanofiber, and PVdF in this slurry was 100:10:10:10.

Then, the slurry was applied to both surfaces of an aluminum foil. The thickness of the aluminum foil was 12 μm. Then, the applied slurry was dried to form a positive electrode active material containing layer on a positive electrode current collector. Thereafter, this was pressed to obtain a positive electrode. In this positive electrode, the positive electrode current collector included a portion not supporting the positive electrode active material containing layer, that is, a current collector tab.

(Production of Electrode Group)

First, the negative electrode and positive electrode obtained by the above-described method, and a strip-shaped separator were prepared. As the separator, a cellulose separator was used. Then, this separator was zigzag-folded. Then, the negative electrode was stacked on the uppermost layer of the zigzag-folded separator. Then, the positive electrodes and the negative electrodes are alternately inserted into spaces formed by zigzag-folding the separator, to obtain a laminate including the separator, the negative electrode, and the positive electrode. During this stacking, the positive electrode tab of the positive electrode current collector and the negative electrode tab of the negative electrode current collector were disposed so as to protrude from a side surface of the laminate and not to overlap in the stacking direction. Then, a negative electrode terminal was connected to the negative electrode tab protruding from the side surface of the laminate by welding. Then, a positive electrode terminal was connected to the positive electrode tab protruding from the side surface of the laminate by welding. Thus, an electrode group was obtained.

(Preparation of Nonaqueous Electrolyte)

Ethylene carbonate (EC) and diethyl carbonate (DEC) were mixed to obtain a mixed solvent. The volume ratio of EC and DEC in this mixed solvent was 1:2. Then, lithium hexafluorophosphate ($LiPF_6$) was dissolved in this mixed solvent to prepare a nonaqueous electrolyte. The molar concentration of $LiPF_6$ in this nonaqueous electrolyte was 1 mol/m³.

(Production of Secondary Battery)

Then, the electrode group obtained by the above-described method was housed in a container member made of a laminate film. In this case, the negative electrode terminal and the positive electrode terminal were extended to the outside of the container member. Then, the circumference of the laminate film was bonded by melting except a part of the circumference. Then, a nonaqueous electrolyte was injected from an unsealed portion of the laminate film, that is, from an injection hole. Then, the injection hole was bonded by melting to obtain a secondary battery. The discharge capacity of this battery was 3.0 Ah.

(Formation of Coating Film)

The nonaqueous electrolyte secondary battery obtained by the above-described method was placed in a thermostat at 25° C. Then, these batteries were subjected to initial charge at a rate of 0.2 C until the battery voltages reached 3.5 V. After the voltage reached 3.5 V, the voltage was maintained for 10 hours. A negative electrode potential when the voltage was 3.5 V was 0.7 V (vs. $Li^+/Li$).

Then, the charged battery was subjected to aging. During aging, an aging temperature was set to 25° C. and the aging time was set to 24 hours.

Then, the aged battery was discharged at a rate of 0.2 C until the battery voltage reached 1.5 V. Then, a part of the container member was opened and the pressure was reduced to remove the gas from the inside of the container member. The opening was then sealed again. Thus, a nonaqueous electrolyte secondary battery in which the coating film was formed on the surface of the negative electrode active material existing in the vicinity of the surface of the negative electrode was obtained.

Example 2

A nonaqueous electrolyte secondary battery was obtained in the same manner as that described in Example 1 except that an aging time was changed from 24 hours to 48 hours.

Example 3

A nonaqueous electrolyte secondary battery was obtained in the same manner as that described in Example 1 except that an aging temperature was changed from 25° C. to 45° C. and an aging time was changed from 24 hours to 12 hours.

Example 4

A nonaqueous electrolyte secondary battery was obtained in the same manner as that described in Example 1 except that an aging temperature was changed from 25° C. to 45° C.

Example 5

A nonaqueous electrolyte secondary battery was obtained in the same manner as that described in Example 1 except that an aging temperature was changed from 25° C. to 60° C. and an aging time was changed from 24 hours to 8 hours.

Example 6

A nonaqueous electrolyte secondary battery was prepared in the same manner as that described in Example 1 except that an aging temperature was changed from 25° C. to 60° C. and an aging time was changed from 24 hours to 12 hours.

Example 7

A nonaqueous electrolyte secondary battery was obtained in the same manner as that described in Example 1 except that a negative electrode potential at the state of full charge was changed from 0.7 V (vs. Li$^+$/Li) to 0.8 V (vs. Li$^+$/Li).

Example 8

A nonaqueous electrolyte secondary battery was obtained in the same manner as that described in Example 1 except that a negative electrode potential at the state of full charge was changed from 0.7 V (vs. Li$^+$/Li) to 0.6 V (vs. Li$^+$/Li).

Example 9

A negative electrode active material was obtained in the same manner as that described in Example 1 except that the addition amount of sucrose was changed from 3.5 parts by mass to 3.6 parts by mass and a carbonization treatment temperature was changed from 700° C. to 750° C.

A nonaqueous electrolyte secondary battery was obtained in the same manner as that described in Example 1 except that this negative electrode active material was used.

Example 10

A negative electrode active material was obtained in the same manner as that described in Example 1 except that the addition amount of sucrose was changed from 3.5 parts by mass to 3.6 parts by mass and a carbonization treatment temperature was changed from 700° C. to 800° C.

A nonaqueous electrolyte secondary battery was obtained in the same manner as that described in Example 1 except that this negative electrode active material was used.

Example 11

A negative electrode active material was obtained in the same manner as that described in Example 1 except that the addition amount of sucrose was changed from 3.5 parts by mass to 3.6 parts by mass and a carbonization treatment temperature was changed from 700° C. to 850° C.

A nonaqueous electrolyte secondary battery was obtained in the same manner as that described in Example 1 except that this negative electrode active material was used.

Example 12

A negative electrode active material was obtained in the same manner as that described in Example 1 except that a carbon source was changed from 3.5 parts by mass of sucrose to 1.1 parts by mass of polyvinyl alcohol (PVA) and a carbonization treatment temperature was changed from 700° C. to 850° C.

A nonaqueous electrolyte secondary battery was obtained in the same manner as that described in Example 1 except that this negative electrode active material was used.

Example 13

A negative electrode active material was obtained in the same manner as that described in Example 1 except that a carbon source was changed from 3.5 parts by mass of sucrose to 5.8 parts by mass of PVA and a carbonization treatment temperature was changed from 700° C. to 850° C.

A nonaqueous electrolyte secondary battery was obtained in the same manner as that described in Example 1 except that this negative electrode active material was used.

Example 14

A negative electrode active material was obtained in the same manner as that described in Example 1 except that a carbon source was changed from 3.5 parts by mass of sucrose to 9.1 parts by mass of PVA and a carbonization treatment temperature was changed from 700° C. to 850° C.

A nonaqueous electrolyte secondary battery was obtained in the same manner as that described in Example 1 except that this negative electrode active material was used.

Example 15

A nonaqueous electrolyte secondary battery was obtained in the same manner as that described in Example 1 except that the type of an electrolyte was changed from LiPF$_6$ to lithium tetrafluoroborate (LiBF$_4$).

Example 16

A nonaqueous electrolyte was obtained in the same manner as described that in Example 1 except that LiBF$_4$ was further added to a nonaqueous electrolyte. The molar concentration of LiBF$_4$ in the nonaqueous electrolyte was 0.2 mol/m$^3$.

A nonaqueous electrolyte secondary battery was obtained in the same manner as that described in Example 1 except that this nonaqueous electrolyte was used.

Example 17

A nonaqueous electrolyte was obtained in the same manner as that described in Example 1 except that bistrifluoromethylsulfonylimide lithium (LiTFSI; LiN(CF$_3$SO$_2$)$_2$) was further added to a nonaqueous electrolyte. The molar concentration of LiTFSI in the nonaqueous electrolyte was 0.2 mol/m$^3$.

A nonaqueous electrolyte secondary battery was obtained in the same manner as that described in Example 1 except that this nonaqueous electrolyte was used.

Example 18

A nonaqueous electrolyte was obtained in the same manner as that described in Example 1 except that lithium bis(pentafluoroethanesulfonyl)imide (LiBETI; LiN(SO$_2$C$_2$F$_5$)$_2$) was further added to a nonaqueous electrolyte. The molar concentration of LiBETI in the nonaqueous electrolyte was 0.2 mol/m$^3$.

A nonaqueous electrolyte secondary battery was obtained in the same manner as that described in Example 1 except that this nonaqueous electrolyte was used.

Example 19

A nonaqueous electrolyte was obtained in the same manner as that described in Example 1 except that lithium bis(fluorosulfonyl)imide (LiFSI; $LiN(SO_2F)_2$) was further added to a nonaqueous electrolyte. The molar concentration of LiFSI in the nonaqueous electrolyte was 0.2 $mol/m^3$.

A nonaqueous electrolyte secondary battery was obtained in the same manner as that described in Example 1 except that this nonaqueous electrolyte was used.

Example 20

A nonaqueous electrolyte was obtained in the same manner as that described in Example 1 except that lithium bis(oxalate)borate (LiBOB; $LiC_4BO_8$) was further added to a nonaqueous electrolyte. The molar concentration of LiBOB in the nonaqueous electrolyte was 0.2 $mol/m^3$.

A nonaqueous electrolyte secondary battery was obtained in the same manner as that described in Example 1 except that this nonaqueous electrolyte was used.

Example 21

A nonaqueous electrolyte was obtained in the same manner as that described in Example 1 except that a solvent of a nonaqueous electrolyte was changed from a mixed solvent of EC and DEC to a mixed solvent of EC and methyl ethyl carbonate (MEC). The volume ratio of EC and MEC in this mixed solvent was 1:2.

A nonaqueous electrolyte secondary battery was obtained in the same manner as that described in Example 1 except that this nonaqueous electrolyte was used.

Example 22

A nonaqueous electrolyte was obtained in the same manner as that described in Example 1 except that a solvent of a nonaqueous electrolyte was changed from a mixed solvent of EC and DEC to a mixed solvent of EC and dimethyl carbonate (DMC). The volume ratio of EC and DMC in this mixed solvent was 1:2.

A nonaqueous electrolyte secondary battery was obtained in the same manner as that described in Example 1 except that this nonaqueous electrolyte was used.

Example 23

A nonaqueous electrolyte was obtained in the same manner as that described in Example 1 except that vinylene carbonate (VC) was further added as an additive to a nonaqueous electrolyte. The concentration of VC in this nonaqueous electrolyte was 1% by mass.

A nonaqueous electrolyte secondary battery was obtained in the same manner as that described in Example 1 except that this nonaqueous electrolyte was used.

Example 24

A nonaqueous electrolyte was obtained in the same manner as that described in Example 1 except that fluoroethylene carbonate (FEC) was further added as an additive to a nonaqueous electrolyte. The concentration of FEC in this nonaqueous electrolyte was 1% by mass.

A nonaqueous electrolyte secondary battery was obtained in the same manner as that described in Example 1 except that this nonaqueous electrolyte was used.

Example 25

A nonaqueous electrolyte was obtained in the same manner as that described in Example 1 except that ethylene sulfite (ES) was further added as an additive to a nonaqueous electrolyte. The concentration of ES in this nonaqueous electrolyte was 1% by mass.

A nonaqueous electrolyte secondary battery was obtained in the same manner as that described in Example 1 except that this nonaqueous electrolyte was used.

Example 26

A nonaqueous electrolyte was obtained in the same manner as that described in Example 1 except that a solvent of a nonaqueous electrolyte was changed from a mixed solvent of EC and DEC to a mixed solvent of propylene carbonate (PC) and DEC, and VC was further added as an additive. The volume ratio of PC and DEC in this mixed solvent was 1:2. The concentration of VC in this nonaqueous electrolyte was 1% by mass.

A nonaqueous electrolyte secondary battery was obtained in the same manner as that described in Example 1 except that this nonaqueous electrolyte was used.

Example 27

A nonaqueous electrolyte was obtained in the same manner as that described in Example 1 except that a solvent of a nonaqueous electrolyte was changed from a mixed solvent of EC and DEC to a mixed solvent of PC and DEC, and FEC was further added as an additive. The volume ratio of PC and DEC in this mixed solvent was 1:2. The concentration of FEC in this nonaqueous electrolyte was 1% by mass.

A nonaqueous electrolyte secondary battery was obtained in the same manner as that described in Example 1 except that this nonaqueous electrolyte was used.

Example 28

A nonaqueous electrolyte was obtained in the same manner as that described in Example 1 except that a solvent of a nonaqueous electrolyte was changed from a mixed solvent of EC and DEC to a mixed solvent of PC and DEC, and ES was further added as an additive. The volume ratio of PC and DEC in this mixed solvent was 1:2. The concentration of ES in this nonaqueous electrolyte was 1% by mass.

A nonaqueous electrolyte secondary battery was obtained in the same manner as that described in Example 1 except that this nonaqueous electrolyte was used.

Comparative Example 1

A nonaqueous electrolyte secondary battery was obtained in the same manner as that described in Example 1 except that a negative electrode potential during charge was changed from 0.7 V (vs. $Li^+/Li$) to 1.0 V (vs. $Li^+/Li$).

Comparative Example 2

A nonaqueous electrolyte secondary battery was obtained in the same manner as that described in Example 1 except that an aging time was changed from 24 hours to 72 hours.

Comparative Example 3

A nonaqueous electrolyte secondary battery was obtained in the same manner as that described in Example 1 except that an aging temperature was changed from 25° C. to 45° C. and an aging time was changed from 24 hours to 72 hours.

Comparative Example 4

A nonaqueous electrolyte secondary battery was obtained in the same manner as that described in Example 1 except that an aging temperature was changed from 25° C. to 60° C. and an aging time was changed from 24 hours to 72 hours.

Comparative Example 5

A nonaqueous electrolyte secondary battery was obtained in the same manner as that described in Example 1 except that aging was omitted.

Comparative Example 6

A negative electrode active material was obtained in the same manner as that described in Example 1 except that a carbonization treatment temperature was changed from 700° C. to 900° C.

A nonaqueous electrolyte secondary battery was obtained in the same manner as that described in Example 1 except that this negative electrode active material was used.

Comparative Example 7

A negative electrode active material was obtained in the same manner as that described in Example 1 except that the addition amount of sucrose was changed from 3.5 parts by mass to 15.1 parts by mass.

A nonaqueous electrolyte secondary battery was obtained in the same manner as that described in Example 1 except that this negative electrode active material was used.

Comparative Example 8

A negative electrode active material was obtained in the same manner as that described in Example 1 except that the addition amount of sucrose was changed from 3.5 parts by mass to 1 part by mass.

A nonaqueous electrolyte secondary battery was obtained in the same manner as that described in Example 1 except that this negative electrode active material was used.

<Evaluation Methods>

(Measurement of Secondary Particle Size)

The secondary particle size of the negative electrode active material particles obtained by each of the methods described in Example 1, Examples 9 to 14, and Comparative Examples 6 to 8 was measured by the above-described method. As a result, the secondary particle size (d50) was 5.0 μm in any example.

(Transmission Electron Microscope Observation)

The surface state of the negative electrode active material obtained by each of the methods described in Example 1, Examples 9 to 14, and Comparative Examples 6 to 8 was confirmed using a transmission electron microscope (TEM). As a result, in the negative electrode active material particles obtained by each of the methods described in Example 1, Examples 9 to 11, and Comparative Examples 6 to 8, a portion not covered with the amorphous carbon body was observed on a part of the surfaces of the monoclinic niobium-titanium composite oxide particles. In contrast, in the negative electrode active material particles obtained by each of the methods described in Examples 12 to 14, the entire surfaces of the monoclinic niobium-titanium composite oxide particles was uniformly coated with the amorphous carbon body. The results are shown in Table 1.

(Measurement of Thickness of Amorphous Carbon Body)

The thickness of the amorphous carbon body contained in the negative electrode active material obtained by each of the methods described in Example 1, Examples 9 to 14, and Comparative Examples 6 to 8 was measured by the method described above. The results are shown in Table 1.

(Calculation of Ratio of Raman G Band to Raman D Band)

The Raman spectrum of the negative electrode active material obtained by each of the methods described in Example 1, Examples 9 to 14, and Comparative Examples 6 to 8 was measured by the above-mentioned method, to calculate the ratio $I_G/I_D$ of peak intensity $I_G$ of a G band to peak intensity $I_D$ of a D band. The results are shown in Table 1.

Here, FIG. 13 is a graph showing a Raman spectrum according to Example 1. FIG. 14 is a graph showing a Raman spectrum according to Comparative Example 6. In FIGS. 13 and 14, a horizontal axis represents a Raman shift and a vertical axis represents scattering intensity. In both the spectra shown in FIGS. 13 and 14, a G band and a D band were detected.

(Measurement of BET Specific Surface Area)

The BET specific surface area of the negative electrode active material obtained by each of the methods described in Example 1, Examples 9 to 14 and Comparative Examples 6 to 8 was measured by the above-described method. The results are shown in Table 1.

(Measurement of Film Thickness of Coating Film)

The film thickness of the coating film present on the surface of the negative electrode of each of the nonaqueous electrolyte secondary batteries according to Examples 1 to 28 and Comparative Examples 1 to 8, specifically, on the surface of the negative electrode active material-containing layer was measured by the above method. The results are shown in Table 3.

(X-Ray Photoelectron Spectrometry)

The battery obtained by each of the methods described in Examples 1 to 28 and Comparative Examples 1 to 8 was subjected to X-ray photoelectron spectroscopy. That is, the surface of the negative electrode included in each of these batteries was subjected to X-ray photoelectron spectrometry by the above-described method to calculate a niobium atom concentration S1, a carbon atom concentration S2, and a phosphorus atom concentration S3. The results are shown in Table 3.

Figure 17:
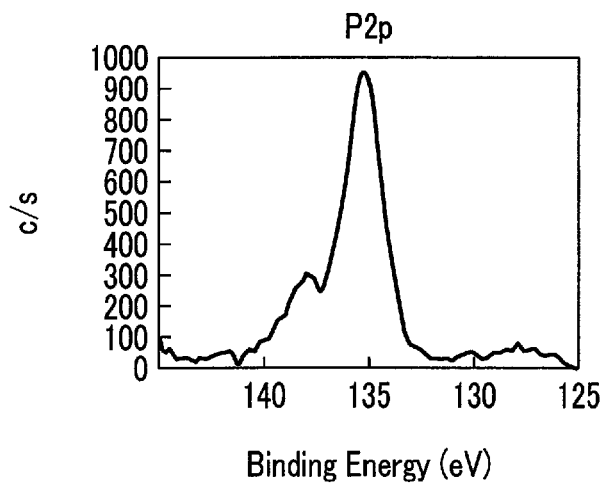
FIG. 17 is a graph showing a narrow scan spectrum of P2p according to Example 1.
Figure 18:
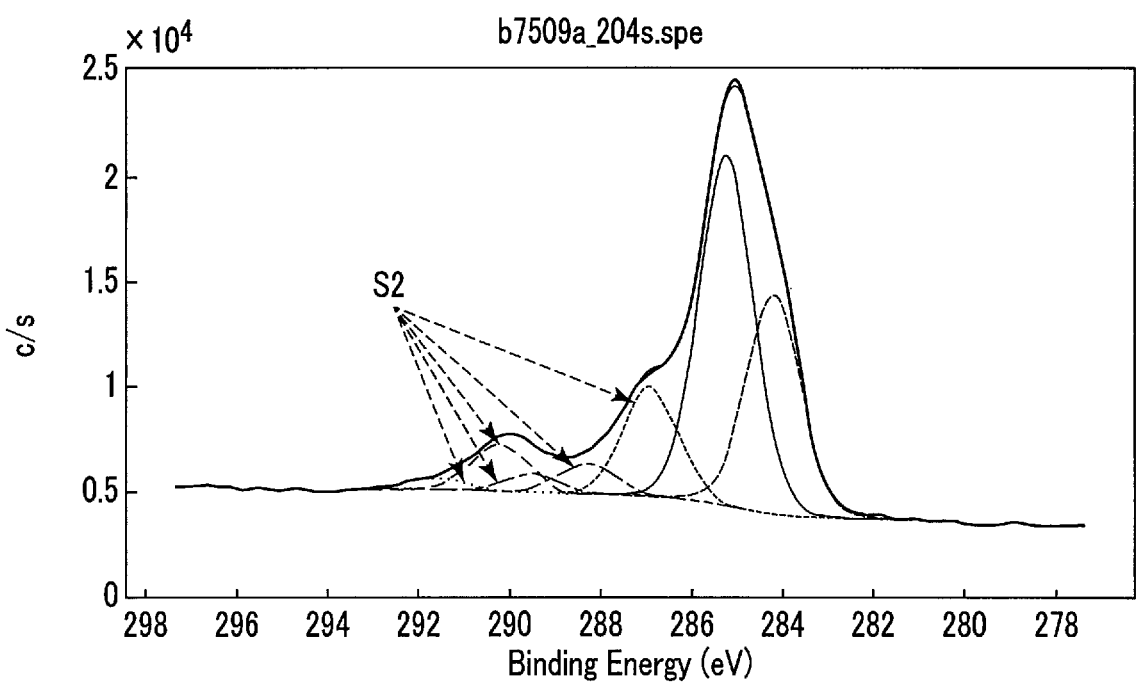
FIG. 18 is a graph showing a narrow scan spectrum of C1s shown in FIG. 16 after peak separation.

Here, FIG. 15 is a graph showing a narrow scan spectrum of Nb3d according to Example 1. FIG. 16 is a graph showing a narrow scan spectrum of C1s according to Example 1. FIG. 17 is a graph showing a narrow scan spectrum of P2p according to Example 1. FIG. 18 is a graph showing the narrow scan spectrum of C1s shown in FIG. 16 after peak separation. FIG. 19 is a graph showing the narrow scan spectrum of P2p shown in FIG. 17 after peak separation. In these figures, a horizontal axis represents the binding energy of photoelectrons, and a vertical axis represents the number of photoelectrons observed per unit time.

As shown in FIG. 18, seven peaks were detected on the C1s spectrum according to Example 1. The seven peaks were detected at the positions of 284.20 eV, 285.23 eV, 286.87 eV, 288.23 eV, 289.43 eV, 290.16 eV, and 291.58 eV. The five peaks detected at the positions of 286.87 eV, 288.23 eV, 289.43 eV, 290.16 eV, and 291.58 eV were used as peaks for calculating the carbon atom concentration S2.

As shown in FIG. 19, two peaks were detected on the P2p spectrum according to Example 1. The two peaks were detected at the positions of 134.50 eV and 137.44 eV. The peak detected at the position of 134.50 eV was used as peak for calculating the phosphorus atom concentration S3.

Here, FIG. 20 is a graph showing a narrow scan spectrum of Nb3d according to Example 3. FIG. 21 is a graph showing a narrow scan spectrum of C1s according to Example 3. FIG. 22 is a graph showing a narrow scan spectrum of P2p according to Example 3. FIG. 23 is a graph showing the narrow scan spectrum of C1s shown in FIG. 21 after peak separation. FIG. 24 is a graph showing the narrow scan spectrum of P2p shown in FIG. 22 after peak separation. In these figures, a horizontal axis represents the binding energy of photoelectrons, and a vertical axis represents the number of photoelectrons observed per unit time.

As shown in FIG. 23, seven peaks were detected on the C1s spectrum according to Example 3. The seven peaks were detected at the positions of 283.98 eV, 285.07 eV, 286.76 eV, 288.07 eV, 289.27 eV, 290.34 eV, and 291.70 eV. The five peaks detected at the positions of 286.76 eV, 288.07 eV, 289.27 eV, 290.34 eV, and 291.70 eV were used as peaks for calculating the carbon atom concentration S2.

As shown in FIG. 24, three peaks were detected on the P2p spectrum according to Example 3. The three peaks were detected at the positions of 134.68 eV, 136.30 eV, and 137.58 eV. The two peaks detected at positions of 134.68 eV and 136.30 eV were used as peaks for calculating the phosphorus atom concentration S3.

Figure 25:
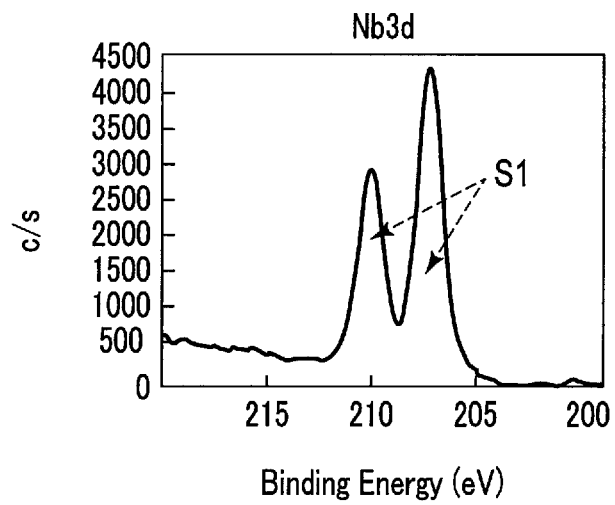
FIG. 25 is a graph showing a narrow scan spectrum of Nb3d according to Example 23.
Figure 26:
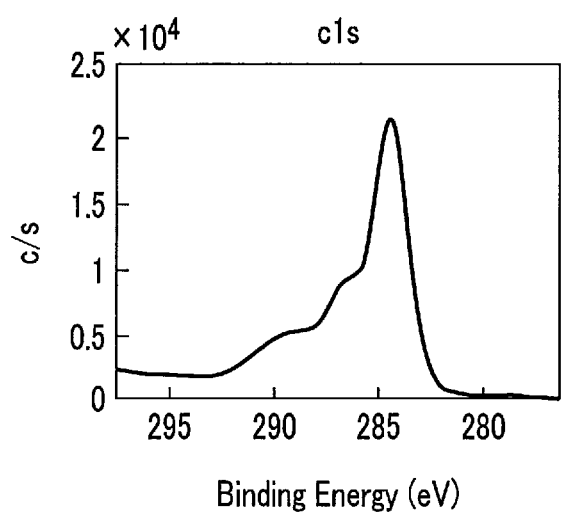
FIG. 26 is a graph showing a narrow scan spectrum of C1s according to Example 23.
Figure 29:
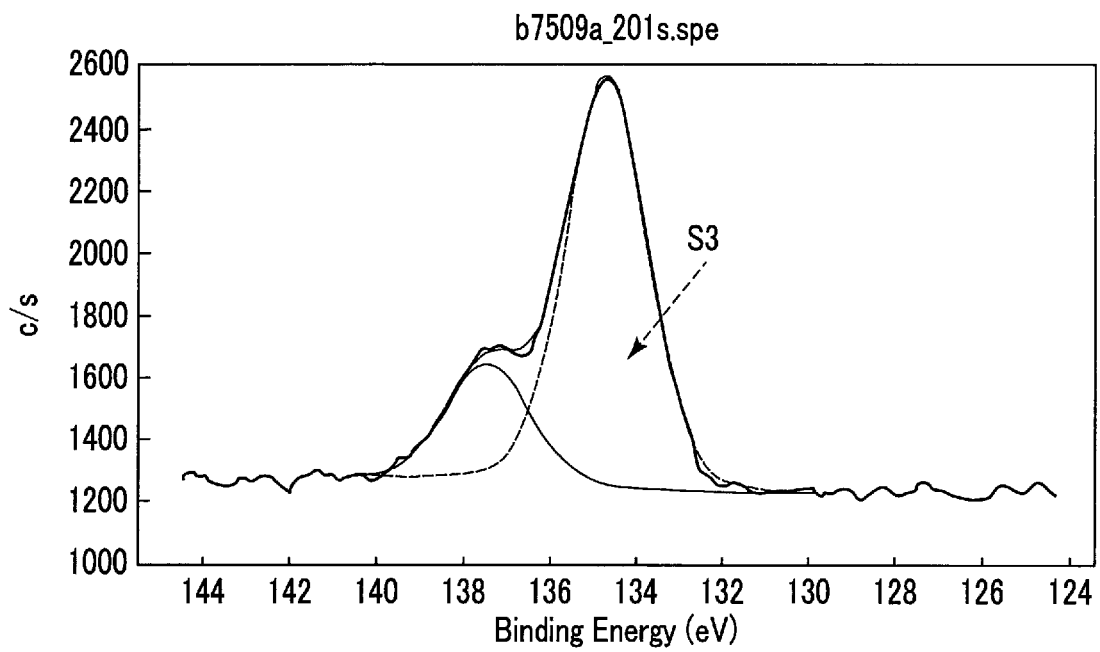
FIG. 29 is a graph showing a narrow scan spectrum of P2p shown in FIG. 27 after peak separation.

Here, FIG. 25 is a graph showing a narrow scan spectrum of Nb3d according to Example 23. FIG. 26 is a graph showing a narrow scan spectrum of C1s according to Example 23. FIG. 27 is a graph showing a narrow scan spectrum of P2p according to Example 23. FIG. 28 is a graph showing the narrow scan spectrum of C1s shown in FIG. 26 after peak separation. FIG. 29 is a graph showing the narrow scan spectrum of P2p shown in FIG. 27 after peak separation. In these figures, a horizontal axis represents the binding energy of photoelectrons, and a vertical axis represents the number of photoelectrons observed per unit time.

As shown in FIG. 28, seven peaks were detected on the C1s spectrum according to Example 23. The seven peaks were detected at the positions of 284.33 eV, 285.22 eV, 287.02 eV, 288.22 eV, 289.42 eV, 290.23 eV, and 291.38 eV. The five peaks detected at the positions of 287.02 eV, 288.22 eV, 289.42 eV, 290.23 eV, and 291.38 eV were used as peaks for calculating the carbon atom concentration S2.

As shown in FIG. 29, two peaks were detected on the P2p spectrum according to Example 23. The two peaks were detected at the positions of 134.66 eV and 137.45 eV. The peak detected at the position of 134.66 eV was used as peak for calculating the phosphorus atom concentration S3.

Figure 30:
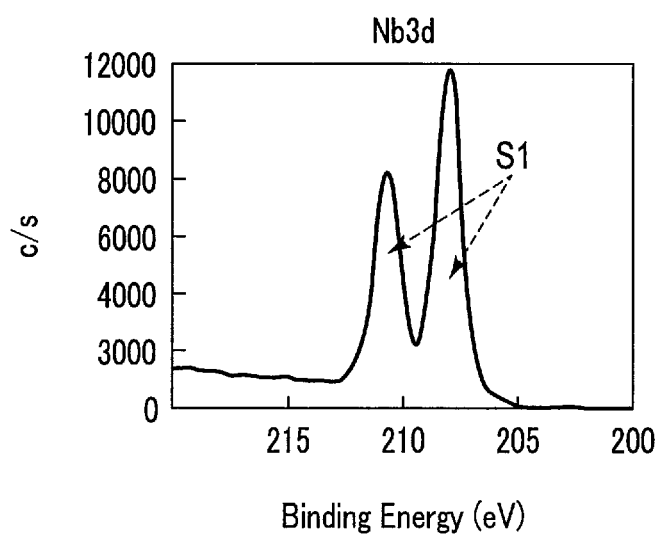
FIG. 30 is a graph showing a narrow scan spectrum of Nb3d according to Comparative Example 1.

Here, FIG. 30 is a graph showing a narrow scan spectrum of Nb3d according to Comparative Example 1. FIG. 31 is a graph showing a narrow scan spectrum of C1s according to Comparative Example 1. FIG. 32 is a graph showing a narrow scan spectrum of P2p according to Comparative Example 1. FIG. 33 is a graph showing the narrow scan spectrum of C1s shown in FIG. 31 after peak separation. FIG. 34 is a graph showing the narrow scan spectrum of P2p shown in FIG. 32 after peak separation. In these figures, a horizontal axis represents the binding energy of photoelectrons, and a vertical axis represents the number of photoelectrons observed per unit time.

As shown in FIG. 33, seven peaks were detected on the C1s spectrum according to Comparative Example 1. The seven peaks were detected at the positions of 284.19 eV, 285.21 eV, 286.73 eV, 288.21 eV, 289.41 eV, 290.60 eV, and 291.59 eV. The five peaks detected at the positions of 286.73 eV, 288.21 eV, 289.41 eV, 290.60 eV, and 291.59 eV were used as peaks for calculating the carbon atom concentration S2.

As shown in FIG. 34, two peaks were detected on a P2p spectrum according to Comparative Example 1. The two peaks were detected at the positions of 134.54 eV and 137.24 eV. The peak detected at the position of 134.54 eV was used as peak for calculating the phosphorus atom concentration S3.

(Measurement of Energy Density)

The energy density of the secondary battery obtained by each of the methods described in Examples 1 to 28 and Comparative Examples 1 to 8 was measured. Specifically, first, a battery was placed in a thermostat set at 25° C. Then, the battery was discharged until a battery voltage reached 3.5 V at a rate of 0.2 C. After the voltage reached 3.5 V, the battery was left standing with this voltage maintained. The total time of the constant current charge and constant voltage charge was 10 hours. Then, the battery was discharged at a rate of 0.2 C until the battery voltage reached 1.5 V to obtain a discharge curve of the battery. In this discharge curve, a horizontal axis represented a discharge capacity (Ah) and a vertical axis represented a battery voltage (V).

Then, from the discharge curve, the electric power (Wh) of the battery was calculated. Then, by dividing the electric power by the discharge capacity, the average operating voltage (V) of the battery was obtained. The volume energy density of the battery was calculated from the average operating voltage thus obtained, the discharge capacity, and the volume of the battery. The results are shown in Table 3.

(Cycle Test)

The nonaqueous electrolyte battery according to each of Examples 1 to 28 and Comparative Examples 1 to 8 was subjected to a cycle test. Specifically, first, a battery was placed in a thermostat set at 45° C. Then, the battery was charged until a battery voltage reached 3.0 V at a rate of 1 C. After the voltage reached 3.0 V, this voltage was maintained until the current value reached 0.05 C. Then, the battery was discharged at a rate of 5 C until a battery voltage reached 1.5 V. The constant current charge, the constant voltage charge, and the constant current discharge were repeated as one cycle. Between the cycles, an interval of 10 minutes was set. This cycle was repeated until the discharge capacity retention rate of the battery with respect to the discharge capacity of the battery after 1 cycle was 80%. The results are shown in Table 3.

Data on Examples 1 to 28 and Comparative Examples 1 to 8 are summarized in Tables 1 to 3 below.

TABLE 1

| | Method of preparing amorphous carbon body | | | Amorphous carbon body | Negative electrode active material | | |
|---|---|---|---|---|---|---|---|
| | Carbon source | Addition amount of carbon source (parts by mass) | Carbonation temperature (° C.) | Thickness (nm) | $I_G/I_D$ | TEM observation | Specific surface area (m²/g) |
| Example 1 | Sucrose | 3.5 | 700 | 2.1 | 0.88 | Uncoated part | 12.1 |
| Example 2 | Sucrose | 3.5 | 700 | 2.1 | 0.88 | Uncoated part | 12.1 |
| Example 3 | Sucrose | 3.5 | 700 | 2.1 | 0.88 | Uncoated part | 12.1 |
| Example 4 | Sucrose | 3.5 | 700 | 2.1 | 0.88 | Uncoated part | 12.1 |
| Example 5 | Sucrose | 3.5 | 700 | 2.1 | 0.88 | Uncoated part | 12.1 |
| Example 6 | Sucrose | 3.5 | 700 | 2.1 | 0.88 | Uncoated part | 12.1 |
| Example 7 | Sucrose | 3.5 | 700 | 2.1 | 0.88 | Uncoated part | 12.1 |
| Example 8 | Sucrose | 3.5 | 700 | 2.1 | 0.88 | Uncoated part | 12.1 |
| Example 9 | Sucrose | 3.6 | 750 | 2.2 | 0.95 | Uncoated part | 12.1 |
| Example 10 | Sucrose | 3.6 | 800 | 2.2 | 1.02 | Uncoated part | 12.1 |
| Example 11 | Sucrose | 3.6 | 850 | 2.2 | 1.15 | Uncoated part | 12.1 |
| Example 12 | PVA | 1.1 | 850 | 1.2 | 0.91 | Favorable uniformity | 6.5 |
| Example 13 | PVA | 5.8 | 850 | 5.1 | 0.91 | Favorable uniformity | 6.6 |
| Example 14 | PVA | 9.1 | 850 | 10.1 | 0.91 | Favorable uniformity | 6.7 |
| Example 15 | Sucrose | 3.5 | 700 | 2.1 | 0.88 | Uncoated part | 12.1 |
| Example 16 | Sucrose | 3.5 | 700 | 2.1 | 0.88 | Uncoated part | 12.1 |
| Example 17 | Sucrose | 3.5 | 700 | 2.1 | 0.88 | Uncoated part | 12.1 |
| Example 18 | Sucrose | 3.5 | 700 | 2.1 | 0.88 | Uncoated part | 12.1 |
| Example 19 | Sucrose | 3.5 | 700 | 2.1 | 0.88 | Uncoated part | 12.1 |
| Example 20 | Sucrose | 3.5 | 700 | 2.1 | 0.88 | Uncoated part | 12.1 |
| Example 21 | Sucrose | 3.5 | 700 | 2.1 | 0.88 | Uncoated part | 12.1 |
| Example 22 | Sucrose | 3.5 | 700 | 2.1 | 0.88 | Uncoated part | 12.1 |
| Example 23 | Sucrose | 3.5 | 700 | 2.1 | 0.88 | Uncoated part | 12.1 |
| Example 24 | Sucrose | 3.5 | 700 | 2.1 | 0.88 | Uncoated part | 12.1 |
| Example 25 | Sucrose | 3.5 | 700 | 2.1 | 0.88 | Uncoated part | 12.1 |
| Example 26 | Sucrose | 3.5 | 700 | 2.1 | 0.88 | Uncoated part | 12.1 |
| Example 27 | Sucrose | 3.5 | 700 | 2.1 | 0.88 | Uncoated part | 12.1 |
| Example 28 | Sucrose | 3.5 | 700 | 2.1 | 0.88 | Uncoated part | 12.1 |
| Comparative Example 1 | Sucrose | 3.5 | 700 | 2.1 | 0.88 | Uncoated part | 12.1 |
| Comparative Example 2 | Sucrose | 3.5 | 700 | 2.1 | 0.88 | Uncoated part | 12.1 |
| Comparative Example 3 | Sucrose | 3.5 | 700 | 2.1 | 0.88 | Uncoated part | 12.1 |
| Comparative Example 4 | Sucrose | 3.5 | 700 | 2.1 | 0.88 | Uncoated part | 12.1 |
| Comparative Example 5 | Sucrose | 3.5 | 700 | 2.1 | 0.88 | Uncoated part | 12.1 |
| Comparative Example 6 | Sucrose | 3.5 | 900 | 2.1 | 1.21 | Uncoated part | 12.1 |
| Comparative Example 7 | Sucrose | 15.1 | 700 | 15 | 0.88 | Uncoated part | 22.7 |
| Comparative Example 8 | Sucrose | 1 | 700 | 0.5 | 0.88 | Uncoated part | 7.1 |

In the above Table 1, in a column labeled with "Carbon source", among columns below the heading "Method of preparing amorphous carbon body", the type of the carbon source used as the raw material of the amorphous carbon body is described. In a column labeled with "Carbon source addition amount (parts by mass)", the addition amount of the carbon source with respect to 100 parts by mass of the monoclinic niobium-titanium composite oxide is described. In a column labeled with "carbonization treatment temperature (° C.)", a temperature during a carbonization treatment is described.

In the above Table 1, the thickness of the amorphous carbon body is described in a column labeled with "Thickness (nm)" in columns below the heading "Amorphous carbon body".

Furthermore, in the above Table 1, in a column labeled with "$I_G/I_D$" in columns below the heading "Negative electrode active material", the ratio of a Raman G band to a Raman D band obtained by Raman spectroscopy is described. In a column labeled with "TEM observation", the results obtained by observation using a transmission electron microscope are described. An "uncoated portion" means that a portion not covered with the amorphous carbon body is present on a part of the surface of the monoclinic niobium-titanium composite oxide. "Favorable uniformity" means that the amorphous carbon body is supported in a state of being uniformly dispersed on the surfaces of the monoclinic niobium-titanium composite oxide particles. In a column labeled with "Specific surface area (m²/g)", the specific surface area of the negative electrode active material is described.

TABLE 2

| | Nonaqueous electrolyte | | | Aging condition | | | Thickness of |
|---|---|---|---|---|---|---|---|
| | Electrolyte salt | Nonaqueous solvent | Additive | Negative electrode potential (V vs. Li$^+$/Li) | Temperature (° C.) | Time | coating film (nm) |
| Example 1 | LiPF$_6$ | EC, DEC | NA | 0.7 | 25 | 24 | 20 |
| Example 2 | LiPF$_6$ | EC, DEC | NA | 0.7 | 25 | 48 | 30 |
| Example 3 | LiPF$_6$ | EC, DEC | NA | 0.7 | 45 | 12 | 50 |
| Example 4 | LiPF$_6$ | EC, DEC | NA | 0.7 | 45 | 24 | 80 |
| Example 5 | LiPF$_6$ | EC, DEC | NA | 0.7 | 60 | 8 | 90 |
| Example 6 | LiPF$_6$ | EC, DEC | NA | 0.7 | 60 | 12 | 120 |
| Example 7 | LiPF$_6$ | EC, DEC | NA | 0.8 | 25 | 24 | 15 |
| Example 8 | LiPF$_6$ | EC, DEC | NA | 0.6 | 25 | 24 | 25 |
| Example 9 | LiPF$_6$ | EC, DEC | NA | 0.7 | 25 | 24 | 20 |
| Example 10 | LiPF$_6$ | EC, DEC | NA | 0.7 | 25 | 24 | 20 |
| Example 11 | LiPF$_6$ | EC, DEC | NA | 0.7 | 25 | 24 | 20 |
| Example 12 | LiPF$_6$ | EC, DEC | NA | 0.7 | 25 | 24 | 30 |
| Example 13 | LiPF$_6$ | EC, DEC | NA | 0.7 | 25 | 24 | 30 |
| Example 14 | LiPF$_6$ | EC, DEC | NA | 0.7 | 25 | 24 | 30 |
| Example 15 | LiBF$_4$ | EC, DEC | NA | 0.7 | 25 | 24 | 20 |
| Example 16 | LiPF$_6$, LiBF$_4$ | EC, DEC | NA | 0.7 | 25 | 24 | 20 |
| Example 17 | LiPF$_6$, LiTFSI | EC, DEC | NA | 0.7 | 25 | 24 | 20 |
| Example 18 | LiPF$_6$, LiBETI | EC, DEC | NA | 0.7 | 25 | 24 | 20 |
| Example 19 | LiPF$_6$, LiFSI | EC, DEC | NA | 0.7 | 25 | 24 | 20 |
| Example 20 | LiPF$_6$, LiBOB | EC, DEC | NA | 0.7 | 25 | 24 | 20 |
| Example 21 | LiPF$_6$ | EC, MEC | NA | 0.7 | 25 | 24 | 20 |
| Example 22 | LiPF$_6$ | EC, DMC | NA | 0.7 | 25 | 24 | 20 |
| Example 23 | LiPF$_6$ | EC, DEC | VC | 0.7 | 25 | 24 | 20 |
| Example 24 | LiPF$_6$ | EC, DEC | FEC | 0.7 | 25 | 24 | 20 |
| Example 25 | LiPF$_6$ | EC, DEC | ES | 0.7 | 25 | 24 | 20 |
| Example 26 | LiPF$_6$ | PC, DEC | VC | 0.7 | 25 | 24 | 20 |
| Example 27 | LiPF$_6$ | PC, DEC | FEC | 0.7 | 25 | 24 | 20 |
| Example 28 | LiPF$_6$ | PC, DEC | ES | 0.7 | 25 | 24 | 20 |
| Comparative Example 1 | LiPF$_6$ | EC, DEC | NA | 1 | 25 | 24 | 5 |
| Comparative Example 2 | LiPF$_6$ | EC, DEC | NA | 0.7 | 25 | 72 | 200 |
| Comparative Example 3 | LiPF$_6$ | EC, DEC | NA | 0.7 | 45 | 72 | 200 |
| Comparative Example 4 | LiPF$_6$ | EC, DEC | NA | 0.7 | 60 | 72 | 200 |
| Comparative Example 5 | LiPF$_6$ | EC, DEC | NA | — | — | — | 5 |
| Comparative Example 6 | LiPF$_6$ | EC, DEC | NA | 0.7 | 25 | 24 | 20 |
| Comparative Example 7 | LiPF$_6$ | EC, DEC | NA | 0.7 | 25 | 24 | 20 |
| Comparative Example 8 | LiPF$_6$ | EC, DEC | NA | 0.7 | 25 | 24 | 5 |

In the above Table 2, in a column labeled with "electrolyte salt" among columns below the heading "Nonaqueous electrolyte", the type of the electrolyte salt is described. In a column labeled with "Nonaqueous solvent", the type of the nonaqueous solvent is described. In a column labeled with "Additive", the type of the additive is described.

In the above Table 2, in a column labeled with "Negative electrode potential (V vs. Li$^+$/Li)" among columns below the heading "Aging condition", a negative electrode potential (vs. Li$^+$/Li) during aging is described. In a column labeled with "Temperature (° C.)", an aging temperature is described. In a column labeled with "time", an aging time is described.

In the above Table 2, the thickness of the coating film provided on the surface of the negative electrode is described in a column below the heading "film thickness (nm)".

TABLE 3

| | XPS measurement results | | | | | Cycle characteristics (number) | Energy density (wh/L) |
|---|---|---|---|---|---|---|---|
| | S1 (atm %) | S2 (atm %) | S3 (atm %) | S2/S1 | S3/S1 | | |
| Example 1 | 2.0 | 13.4 | 0.8 | 6.7 | 0.4 | 2000 | 280 |
| Example 2 | 1.2 | 11.8 | 2.9 | 9.8 | 2.4 | 2200 | 280 |
| Example 3 | 1.1 | 11.0 | 2.7 | 10.0 | 2.5 | 2400 | 280 |
| Example 4 | 0.4 | 20.1 | 3.0 | 50.3 | 7.5 | 2300 | 280 |
| Example 5 | 1.1 | 11.3 | 2.6 | 10.3 | 2.4 | 2200 | 280 |
| Example 6 | 0.3 | 21.2 | 2.9 | 70.7 | 9.7 | 2300 | 280 |
| Example 7 | 2.2 | 14.7 | 0.9 | 6.7 | 0.4 | 1900 | 270 |
| Example 8 | 1.9 | 12.9 | 0.8 | 6.8 | 0.4 | 2000 | 285 |
| Example 9 | 2.0 | 13.2 | 1.0 | 6.6 | 0.5 | 2000 | 280 |
| Example 10 | 2.1 | 12.8 | 0.8 | 6.6 | 0.5 | 1900 | 280 |
| Example 11 | 2.1 | 12.6 | 0.8 | 6.6 | 0.5 | 1900 | 280 |
| Example 12 | 1.5 | 13.4 | 0.8 | 8.9 | 0.5 | 2400 | 280 |

TABLE 3-continued

| | XPS measurement results | | | | | Cycle | |
|---|---|---|---|---|---|---|---|
| | S1 (atm %) | S2 (atm %) | S3 (atm %) | S2/S1 | S3/S1 | characteristics (number) | Energy density (wh/L) |
| Example 13 | 1.2 | 13.5 | 0.8 | 11.3 | 0.7 | 2500 | 280 |
| Example 14 | 1.0 | 13.6 | 0.9 | 13.6 | 0.9 | 2400 | 280 |
| Example 15 | 2.0 | 13.4 | — | 6.7 | — | 2100 | 280 |
| Example 16 | 2.0 | 13.4 | 0.8 | 6.7 | 0.4 | 2050 | 280 |
| Example 17 | 2.1 | 13.5 | 0.8 | 6.4 | 0.4 | 2200 | 280 |
| Example 18 | 2.1 | 13.5 | 0.8 | 6.4 | 0.4 | 2200 | 280 |
| Example 19 | 2.1 | 13.5 | 0.8 | 6.4 | 0.4 | 2200 | 280 |
| Example 20 | 2.1 | 13.5 | 0.8 | 6.4 | 0.4 | 2200 | 280 |
| Example 21 | 2.0 | 13.4 | 0.8 | 6.7 | 0.4 | 1950 | 280 |
| Example 22 | 2.0 | 13.4 | 0.8 | 6.7 | 0.4 | 1900 | 280 |
| Example 23 | 0.7 | 19.5 | 0.5 | 27.9 | 0.7 | 2400 | 280 |
| Example 24 | 0.6 | 15.0 | 0.4 | 25 | 0.7 | 2400 | 280 |
| Example 25 | 0.6 | 21.2 | 0.4 | 35.3 | 0.7 | 2400 | 280 |
| Example 26 | 0.9 | 17.1 | 0.6 | 27.9 | 0.7 | 2200 | 280 |
| Example 27 | 0.8 | 16.3 | 0.5 | 20.4 | 0.7 | 2200 | 280 |
| Example 28 | 0.8 | 20.2 | 0.5 | 25.3 | 0.7 | 2200 | 280 |
| Comparative Example 1 | 2.4 | 9.8 | 0.7 | 4.1 | 0.3 | 1000 | 250 |
| Comparative Example 2 | 0.1 | 11.8 | 2.9 | 118 | 29 | 1500 | 280 |
| Comparative Example 3 | 0.1 | 11.0 | 2.7 | 110 | 27.28 | 1500 | 270 |
| Comparative Example 4 | 0.1 | 11.3 | 2.6 | 113.3 | 26.4 | 1500 | 260 |
| Comparative Example 5 | 2.8 | 12.3 | 0.8 | 4.4 | 0.3 | 1500 | 280 |
| Comparative Example 6 | 2.0 | 9.6 | 0.8 | 4.8 | 0.4 | 1500 | 270 |
| Comparative Example 7 | 1.8 | 8.0 | 0.7 | 4.4 | 0.4 | 1600 | 270 |
| Comparative Example 8 | 4.2 | 9.6 | 1.7 | 2.3 | 0.4 | 1600 | 280 |

In the above Table 3, in a column labeled with "Si (atm %)" among columns below the heading "XPS measurement result", the niobium atom concentration S1 obtained by the above-described method is described. In a column labeled with "S2 (atm %)", the carbon atom concentration S2 obtained by the above-described method is described. In a column labeled with "S3 (atm %)", the phosphorus atom concentration S3 obtained by the above-described method is described. In a column labeled with "S2/S1", the ratio of the carbon atom concentration S2 to the niobium atom concentration S1 is described. In a column labeled with "S3/S1", the ratio of the phosphorus atom concentration S3 to the niobium atom concentration S1 is described.

In the above Table 3, the number of cycles when the capacity retention ratio obtained in the above cycle test reaches 80% is described in a column below the heading "Cycle Characteristics (number)". In a column below the heading "Energy density (Wh/L)", the electric power per unit volume of the battery is described.

As shown in Table 3, the cycle characteristics of the battery according to each of Examples 1 to 28 in which the ratio S2/S1 of the carbon atom concentration S2 to the niobium atom concentration S1 was 5 to 100 were more excellent than those of the battery according to each of Comparative Examples 1 and 5 to 8 in which the ratio S2/S1 was lower than 5 and Comparative Examples 2 to 4 in which the ratio S2/S1 was higher than 100. This is considered to be because a favorable coating film functioning as a passive state is formed on the surfaces of the negative electrode active material particles positioned on the surface of the negative electrode.

Therefore, the battery according to each of Examples 1 to 28 in which the ratio S2/S1 was 5 to 100 could achieve a high energy density and excellent cycle characteristics.

As is apparent from Example 1 and Examples 24 to 26 in which only the presence or absence of the additive differed among experimental examples shown in Tables 2 and 3, by adding the additive to the nonaqueous electrolyte, the cycle characteristics of the battery could be improved.

As shown in Tables 1 and 3, even when the raw material of the amorphous carbon body, that is, the carbon source was changed, excellent cycle characteristics could be achieved.

As shown in Tables 2 and 3, even when the type of the electrolyte salt or nonaqueous solvent was changed, excellent cycle characteristics could be achieved.

In the electrode and secondary battery according to at least one embodiment described above, the ratio S2/S1 of the carbon atom concentration S2 to the niobium atom concentration S1 in the surface of the electrode obtained by X-ray photoelectron spectroscopy is from 5 to 100. On the surface of such an electrode, a favorable coating film which suppresses further reductive decomposition of the nonaqueous electrolyte and has low internal resistance is provided. Therefore, the use of such an electrode as the negative electrode can suppress further reductive decomposition of the electrolyte even if the lower limit value of the negative electrode potential during charge is set to be lower than 1.0 V (vs. Li$^+$/Li). Therefore, the secondary battery according to at least one embodiment including such a negative electrode can achieve a high energy density and excellent cycle characteristics.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A secondary battery comprising an electrode comprising active material particles and an electrolyte, wherein:
   the active material particles contain monoclinic niobium-titanium composite oxide particles and an amorphous carbon body covering at least a part of surfaces of the monoclinic niobium-titanium composite oxide particles;
   at least a part of a surface of the amorphous carbon body is covered with a coating film containing carbon;
   the coating film has a thickness of 10 nm to 150 nm;
   a ratio S2/S1 of a carbon atom concentration S2 to a niobium atom concentration S1 at a surface of the electrode, according to X-ray photoelectron spectroscopy, is from 5 to 100;
   the niobium atom concentration S1 is an intensity of an area for a peak related to Nb3d; and
   the carbon atom concentration S2 is a total of intensities of areas for peaks related to C1s within a range of 286 eV to 294 eV and the peaks comprising a peak assigned to a C—O bond, a peak assigned to a C═O bond, a peak assigned to a C(═O)—O bond, and a peak assigned to a $CO_3^{2-}$ bond.

2. The secondary battery according to claim 1, wherein:
   the surface of the electrode further comprises a phosphorus atom, and a ratio S3/S1 of a concentration S3 of the phosphorus atom to the niobium atom concentration S1 at the surface of the electrode, according to X-ray photoelectron spectroscopy, is from 0.3 to 20;

the concentration S3 of the phosphorus atom is an intensity of an area for a peak related to P2p within a range of 133 eV to 137 eV and assigned to a $PF_xO_y$ bond;

x is from 0 to 1; and y is more than 0 and 1 or less.

3. The secondary battery according to claim 1, wherein a thickness of the amorphous carbon body is from 1 nm to 10 nm.

4. The secondary battery according to claim 1, wherein:

a Raman spectrum of the active material particles according to Raman spectroscopy has a G band within a range of 1530 $cm^{-1}$ to 1630 $cm^{-1}$ and a D band within a range of 1280 $cm^{-1}$ to 1380 $cm^{-1}$; and a ratio $I_G/I_D$ of peak intensity $I_G$ of the G band to peak intensity $I_D$ of the D band is 1.2 or less.

5. The secondary battery according to claim 1, comprising:

the electrode as a negative electrode; and a positive electrode.

6. The secondary battery according to claim 1, wherein the electrolyte contains at least one compound selected from the group consisting of vinylene carbonate (VC), fluoroethylene carbonate (FEC), and ethylene sulfite (ES).

7. A battery pack comprising the secondary battery according to claim 1.

8. The battery pack according to claim 7, further comprising:

an external power distribution terminal; and a protective circuit.

9. The battery pack according to claim 7, wherein:

the battery pack includes a plural secondary batteries; and the plural secondary batteries are electrically connected in series, in parallel, or in combination of series and parallel.

10. A vehicle comprising the battery pack according to claim 7.

11. The vehicle according to claim 10, which comprises a mechanism configured to convert kinetic energy of the vehicle into regenerative energy.

12. The secondary battery according to claim 1, wherein the thickness of the coating film is 15 nm to 150 nm.

* * * * *